(12) United States Patent
Novik et al.

(10) Patent No.: US 6,314,533 B1
(45) Date of Patent: Nov. 6, 2001

(54) SYSTEM AND METHOD FOR FORWARD CUSTOM MARSHALING EVENT FILTERS

(75) Inventors: Lev Novik, Bellevue; Raymond McCollum, Monroe; Irena Hudis, Bellevue, all of WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/175,827

(22) Filed: Oct. 20, 1998

Related U.S. Application Data

(63) Continuation-in-part of application No. 09/158,171, filed on Sep. 21, 1998.

(51) Int. Cl.⁷ .................................................. G06F 11/00
(52) U.S. Cl. ................................... 714/39; 714/57; 707/3; 709/318
(58) Field of Search .................................. 714/57, 48, 39; 707/3, 6; 709/318, 321

(56) References Cited

U.S. PATENT DOCUMENTS

| | | | |
|---|---|---|---|
| 5,696,701 | * 12/1997 | Burgess et al. | 364/551.01 |
| 5,870,605 | * 2/1999 | Bracho et al. | 395/682 |
| 5,881,315 | * 3/1999 | Cohen | 395/872 |
| 5,999,978 | * 12/1999 | Angal et al. | 709/229 |
| 6,138,121 | * 10/2000 | Costa et al. | 707/100 |
| 6,199,109 | * 3/2001 | Reder et al. | 709/224 |

\* cited by examiner

Primary Examiner—Robert Beausoleil
Assistant Examiner—Scott Baderman
(74) Attorney, Agent, or Firm—Workman, Nydegger & Seeley

(57) ABSTRACT

Systems and methods for reporting the occurrence of events in a computer system to event subscriber software are disclosed. Events arc detected within a computer system or computer system environment by event detection components. An Event provider receives notification of the occurrence of each event. Instead of the event provider then forwarding each of the events to a single, centralized location for filtering, embodiments of the present invention perform the filtering of events at the location of the event provider. This is accomplished by custom forward marshaling a proxy to each event provider. Also marshaled is at least one event-filtering definition that specifics which events should be reported by that event provider to the subscriber software. The event-filtering definitions are written in a structured query language, which can be used to precisely select which events are to be reported. In this way, instead of reporting each event received by it, an event provider, by virtue of the proxy procedure, will only report those events that have been requested by an event subscriber. Non requested events are discarded, thereby reducing the use of processing resources that would otherwise be used if all events were sent to a single, centralized filter.

21 Claims, 13 Drawing Sheets

SYSTEM AND METHOD FOR FORWARD CUSTOM MARSHALING EVENT FILTERS

RELATED APPLICATION

This application is a continuation-in-part of U.S. patent application Ser. No. 09/158,171, entitled "Using Query Language for Event Filtering and Aggregation," and filed Sep. 21, 1998, which is hereby incorporated by reference.

BACKGROUND OF THE INVENTION

1. The Field of the Invention

The present invention relates to systems and methods for reporting the occurrence of events in a computer system to event subscriber software. More specifically, the present invention relates to systems and methods for associating an event filter with an event detection component of a computer system, where the event filter specifies which events detected at the event detection component should be forwarded to event subscriber software, and which should be discarded.

2. The Prior State of the Art

As computers and computer network systems have become more sophisticated, processes for detecting the occurrence of events in hardware and software components have become increasingly important and complex. Knowledge of events occurring in computer systems allows applications, such as management-type application software, to reliably identify the components and configuration of a computer system, to respond to hardware failure, or to otherwise monitor and improve the efficient operation of the system. The range of events that may be detected by computer systems and reported to management or other subscriber applications is essentially unlimited. Examples of computer detectable events, to name just a few, include disk drive activity and errors, installation or deinstallation of hardware components, network server activities and failures, and home, business, or network security breaches.

Events are often detected by software drivers that are associated with the hardware components, operating system software, and instrumentation that are specifically designed to monitor hardware or software. Typically, the driver will forward the event to any requesting application (sometimes generically referred to herein as "subscriber programs" or "event subscribers"). However, as the number of hardware components, the complexity of software, and the size of computer networks increases, it becomes increasingly difficult to create and implement subscriber programs that monitor the occurrence of events in a timely and efficient manner.

FIG. 1 is a schematic diagram illustrating a conventional approach for informing an event subscriber application of the occurrence of events. A computer system 10 has a plurality of device drivers 12 operating in kernel mode and an event subscriber 14 operating in user mode. The event subscriber can be, for example, a management program or any similar computer-executable program that is written to monitor and/or respond to selected events detected by drivers 12 so as to monitor and respond to events that occur in computer system. Computer system 10 also has a Simple Network Management Protocol (SNMP) event provider 16, which is a computer-executable program, written to a standard protocol, for detecting events occurring in a network, such as network 18 of FIG. 1. Other event providers, which are program components that usually interface with device drivers and function to forward event reports to a subscriber program when events are generated by a corresponding device driver, could also be present.

An event subscriber 14 could be local (as shown in FIG. 1) or instead could be on a remote machine with respect to computer system 10. To learn of the events detected by drivers 12, the executable code of event subscriber 14 must have been written to be compatible with the interfaces 20 exposed by drivers 12. Likewise, in order to learn of events occurring in network 18, the executable code of event subscriber 14 must be written to be compatible with the interface 22 exposed by SNMP provider 16.

The requirement that event subscribers in conventional systems must be compatible with and issue the proper requests to interfaces associated with event providers drivers or other instrumentation for detecting events adds complexity to the process of monitoring events. For instance, in a system having multiple device drivers or event providers, the event subscriber 14 typically must be written to the different interfaces presented. This adds complexity to the development and maintenance of event subscriber software. Also, as new hardware/software driver components are added to a computer system, they may utilize interfaces that are incompatible with the existing subscriber software. Again, this requires that the existing subscriber software be revised to be made compatible with new driver interfaces, or requires that new compatible software be purchased and installed. This is time consuming and expensive.

In conventional systems, such as that illustrated by FIG. 1, any and all events that are detected by drivers 12 or by SNMP provider are all automatically reported to event subscriber 14, whether it is local, as shown, or located at a remote machine. Typically however, the event subscriber may only have an interest in a limited subset of the total events reported. Those events that are not of interest are simply discarded and ignored (i.e., "filtered") at the event subscriber. This forwarding of all event notifications from drivers and event providers generates large amounts of data traffic, much of which results from events that are not of interest to the event subscriber(s). This increases processing overhead within a system, and is particularly evident in systems having remote event subscribers, in which notifications of events are transmitted over a network infrastructure. Moreover, the problem is exasperated as the number of drivers 12 and event providers—and resulting detected events—increases.

In view of the foregoing, there is a need in the art for improved systems and methods that facilitate the reporting of events from event providers drivers, and other instrumentation. It would be an advancement in the art to provide a reporting system and method that uses a standard prescribed programming interface so that writers of event subscriber software need not be concerned with different programming interfaces used by different drivers and event providers, and vice-versa. It would also be advantageous to provide a system in which only events of interest are reported to event subscribers. Preferably, the filtering of events would be performed at the event provider itself, such that any events that are not requested by a subscriber would be discarded at the event provider. This approach further would decrease the overall data transmission traffic within the computer system and/or communications network, thereby freeing up system/network resources for other operations

SUMMARY AND OBJECTS OF THE INVENTION

The present invention relates generally to the notification and reporting of any type of hardware and/or software initiated event that can be detected within a computer system. Examples of such computer system events include disk drive activities such as read/write error occurrences; installation or deinstallation of hardware/software components; the occurrence of network activities and failures; the occurrence of home, business, or network security breaches; and practically any other event that is capable of being detected by a computer or computer instrumentation—either locally or across a data communications link. The occurrence of such events are reported to subscriber software applications, which often are computer System management or computer network management-type applications. although any software or hardware component that requires notification of an event would be considered such a subscriber.

In particular, the present invention is directed to systems and methods for specifying which computer system events are to be reported to a subscriber program. This filtering function is implemented in a manner such that a standardized interface is provided to event providers (i.e., the software components, usually associated with a corresponding device driver, that detect and report the occurrence of an event) and to subscriber programs. This approach provides an environment wherein the writers of subscriber programs and event providers/device drivers need only write their applications to a single defined interface, thereby eliminating the need to conform with a plurality of proprietary interfaces. Moreover, the functionality provided by the method of the present invention is transparent from the standpoint of the subscriber program, which receives notification of events in a standard way regardless of the type of event providers included in the system, or whether event providers are included in the system at all. Also, due the functionality provided by the systems and methods of the present invention, subscriber programs need not be written to provide filtering of events, thereby further reducing the cost and complexity of developing such subscriber applications.

In one preferred implementation. an event filter is specified so as to satisfy the event reporting requirements of a subscriber program. The filter includes event-filtering definitions that are preferably written in a structured query-like language, although other filter-defining approaches could be used. The event-filtering definition specifies thresholds and filtering conditions that operate to specify the events to be reported to the corresponding subscriber program. The flexibility and power of the structured query language approach provides the ability to define a wide range of conditions under which a specific event, or class of events, is to be reported to a subscriber. For instance, events may be reported based upon their time of occurrence or frequency of occurrence, or based upon any one of a myriad of different conditions.

In order to establish a context in which the query-based event-filtering definitions can be understood and processed, the computer system can also include a schema repository for storing an object-oriented event classification of event classes. The event classes defined in the event classification comprehend a set of possible events that may occur within the computer system/network. For example, any event detected and reported by an event provider belongs to one of the event classes. The event classification can be defined hierarchically, such that event classes are related one to another in parent/child relationships.

In operation, when an event provider reports the occurrence of an event to an event-filtering component, the event is evaluated against the event-filtering definitions to determine if a notification of the event occurrence should be forwarded a subscriber program(s). If the event satisfies the parameters specified in the definition, it is reported to the corresponding subscriber program(s). If not, the event is discarded and not forwarded. Optimally, the query-based definitions are implemented in an event-filtering component that resides relatively close to the source of the events. This reduces the volume of event-data traffic needed to notify subscriber programs of the occurrence of events. For example, the query-based definitions can permit filtering to occur at a local machine before transmitting notifications of events to subscriber programs located at remote machines. Of course, this eliminates the transmission of unneeded events that would otherwise have occurred in prior art systems.

The volume of data traffic within a computer system can be further reduced by performing the filtering function at a point that is closer to the source of the events. For instance, in one specified embodiment, all of the event-filtering definitions for a computer system reside in a single, event filter component. Using this approach, event providers forward a notification of all detected events to the event filter component, where the corresponding filter(s) is applied. At this point, events are either forwarded to a subscriber, or are discarded. While this approach is an improvement over the systems and methods of the prior art, it will be appreciated that the forwarding of all events by a event provider results in the transmission of some events that will ultimately be discarded. Again, this results in what ultimately is unnecessary data traffic, which effects the efficiency and throughput of the computer system and/or network.

This potential inefficiency is addressed in another aspect of the current invention which further reduces the volume of event-reporting data traffic taking place within the system, namely, the unneeded transmission of events by event providers that are ultimately discarded by the event filter component. In this embodiment, when an event provider is activated and initialized, a communications link is established with the event provider. A "proxy procedure," is then custom marshaled to, and associated with, the event provider program component. This existence of this proxy procedure is transparent to the functioning of the event provider, and it is able to continue operating in its standard way. This is because the proxy provides the same standard interface that is otherwise presented by a centrally located event filter component. As such, the event provider will report events in a conventional manner.

Once the proxy is custom marshaled to the event provider, an event filtering definition for that provider is also forwarded to and implemented within the proxy via the established communications link. In operation, the event provider will attempt to forward all detected events to the event filter component. However, before transmission of the event notification occurs, the proxy procedure functions so as to apply the filtering definition to the event occurrence. As before, if the definition's conditions are satisfied, the event is forwarded on to the central event filter component, and from there, forwarded to the appropriate subscriber. If not, the event is discarded. It will be appreciated that this placement and operation of the filter at the actual event provider reduces the transmission of unnecessary events within the computer system/network. Instead of forwarding all events to a single filtering point, appropriate filters are distributed and implemented at each provider. In this way, only the events that arc detected by a provider and that satisfy the filter parameters (i.e., are requested by a subscriber) are forwarded within the system. This reduces the amount of data traffic within the computer system and/or network.

Additional objects and advantages of the invention will be set forth in the description which follows, and in part will be obvious from the description, or may be learned by the practice of the invention. The objects and advantages of the invention may be realized and obtained by means of the instruments and combinations particularly pointed out in the appended claims. These and other objects and features of the present invention will become more fully apparent from the following description and appended claims, or may be learned by the practice of the invention as set forth hereinafter.

BRIEF DESCRIPTION OF THE DRAWINGS

In order that the manner in which the above-recited and other advantages and objects of the invention are obtained, a more particular description of the invention briefly described above will be rendered by reference to specific embodiments thereof which are illustrated in the appended drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION OF THE PREFERRED EMBODIMENTS

The invention is described below by using diagrams to illustrate either the structure or processing of embodiments used to implement the system and method of the present invention. Using the diagrams in this manner to present the invention should not be construed as limiting of its scope. The present invention contemplates both methods and systems for the hierarchical storage of data. The embodiments of the present invention may comprise a special purpose or general purpose computer comprising various computer hardware, as discussed in greater detail below.

Embodiments within the scope of the present invention also include computer-readable media having computer-executable instructions or data fields stored thereon. Such computer-readable media can be any available media which can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to store the desired computer-executable instructions or data fields and which can accessed by a general purpose or special purpose computer. When information is transferred or provided over a network or other communications connection to a computer, the computer properly views the connection as a computer-readable medium. Thus, such a connection is also properly termed a computer-readable medium. Combinations of the above should also be included within the scope of computer-readable media. Computer-executable instructions comprise, for example, instructions and data which cause a general purpose computer, special purpose computer, or special purpose processing device to perform a certain function or group of functions.

Suitable Computing Environment

Figure 1:
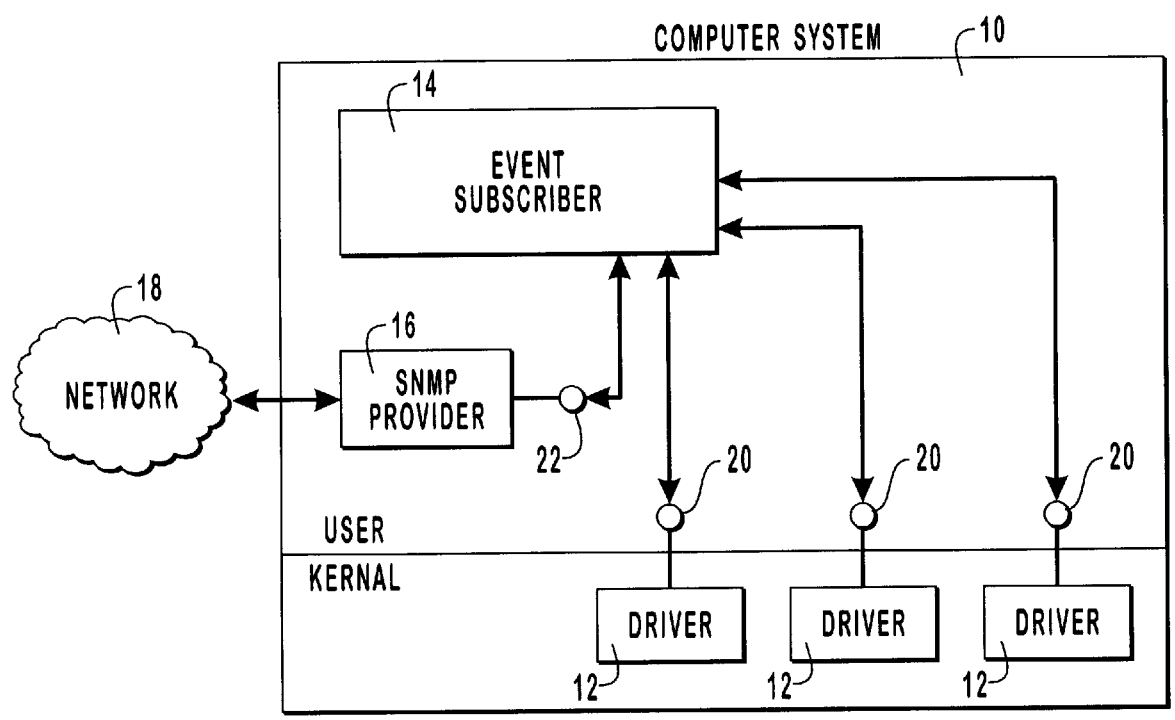
FIG. 1 is a schematic diagram illustrating a prior art system for detecting events in a computer system.
Figure 2:
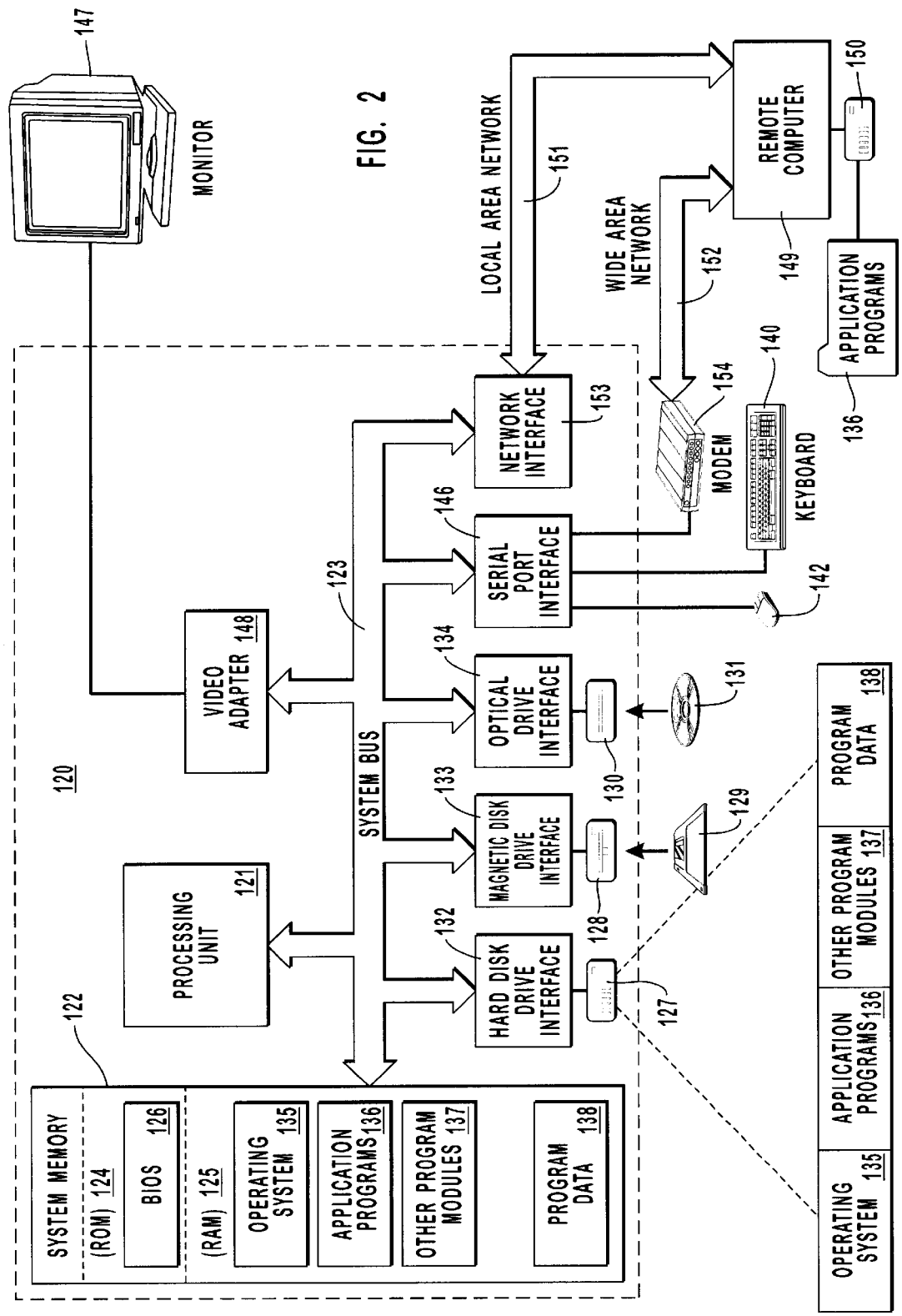
FIG. 2 is an example system that provides a suitable operating environment for the present invention.

FIG. 2 and the following discussion are intended to provide a brief, general description of a suitable computing environment in which the invention may be implemented. Although not required, the invention will be described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multi-processor systems, microprocessor-based or programmable consumer electronics. network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 2, an exemplary system for implementing the invention includes a general purpose computing device in the form of a conventional computer 120, including a processing unit 121, a system memory 122, and a system bus 123 that couples various system components including the system memory to the processing unit 121. The system bus 123 may be any of several types of bus structures including a memory bus or memory controller. a peripheral bus, and a local bus using any of a variety of bus architectures. The system memory includes read only memory (ROM) 124 and random access memory (RAM) 125. A basic input/output system (BIOS) 126, containing the basic routines that help to transfer information between elements within the computer 120, such as during start-up, may be stored in ROM 124.

The computer 120 may also include a magnetic hard disk drive 127 for reading from and writing to a magnetic hard disk, not shown, a magnetic disk drive 128 for reading from or writing to a removable magnetic disk 129, and an optical disk drive 130 for reading from or writing to removable optical disk 131 such as a CD-ROM or other optical media. The magnetic hard disk drive 127, magnetic disk drive 128, and optical disk drive 130 are connected to the system bus 123 by a hard disk drive interface 132, a magnetic disk drive-interface 133, and an optical drive interface 134, respectively. The drives and their associated computer-readable media provide nonvolatile storage of computer readable instructions. data structures, program modules and other data for the computer 120. Although the exemplary environment described herein employs a magnetic hard disk 127, a removable magnetic disk 129 and a removable optical disk 131, it should be appreciated by those skilled in the art that other types of computer readable media which can store data that is accessible by a computer, such as magnetic cassettes, flash memory cards, digital video disks, Bernoulli cartridges, random access memories (RAMs), read only memories (ROM), and the like, may also be used in the exemplary operating environment.

A number of program modules may be stored on the hard disk, magnetic disk 129, optical disk 131, ROM 124 or RAM 125, including an operating system 135, one or more application programs 136, other program modules 137, and program data 138. A user may enter commands and information into the computer 120 through input devices such as a keyboard 140 and pointing device 142. Other input devices (not shown) may include a microphone, joy stick, game pad, satellite dish, scanner, or the like. These and other input devices are often connected to the processing unit 121 through a serial port interface 146 that is coupled to system bus 123, but may be connected by other interfaces, Such as a parallel port, game port or a universal serial bus (USB). A monitor 147 or other type of display device is also connected to system bus 123 via an interface, such as video adapter 148. In addition to the monitor, personal computers typically include other peripheral output devices (not shown), such as speakers and printers.

The computer 120 may operate in a networked environment using logical connections to one or more remote computers, such as a remote computer 149. Remote computer 149 may be another personal computer, a server, a router, a network PC, a peer device or other common network node, and typically includes many or all of the elements described above relative to the computer 120, although only a memory storage device 150 has been illustrated in FIG. 2. The logical connections depicted in FIG. 2 include a local area network (LAN) 151 and a wide area network (WAN) 152 that are presented here by way of example and not limitation. Such networking environments are commonplace in offices enterprise-wide computer networks, intranets and the Internet.

When used in a LAN networking environment, the computer 120 is connected to the local network 151 through a network interface or adapter 153. When used in a WAN networking environment, the computer 120 typically includes a modem 154 or other means for establishing communications over the wide area network 152, such as the Internet. The modem 154, which may be internal or external, is connected to the system bus 123 via the serial port interface 146. In a networked environment, program modules depicted relative to the computer 120, or portions thereof, may be stored in the remote memory storage device. It will be appreciated that the network connections shown are exemplary and other means of establishing a communications link between the computers may be used.

System Overview

The invention is described herein in the context of reporting the occurrence of events from an event-filtering component to an event subscriber. It is to be understood that events may be reported from event-filtering components, or cores, to any desired "event subscriber", which is defined herein as any hardware component, software component, program module, peripheral, or the like, capable of receiving reports of the occurrence of events. Event subscribers can be management computer programs or any other event consumer. Event subscribers can be local or instead can be located remotely and communicate with the event-filtering component by means of a network infrastructure.

As used herein, the term "event" is to be given its ordinarily understood meaning, and can refer to an event occurring in a computer, a computer network, or the environment of a computer. For example, events can refer to activity in hardware or software components, and can also include installation, deinstallation, or modification of hardware or software components.

The term "event provider", as used herein, extends to hardware or software components that can report the occurrence of events to the event-filtering components of the invention. For example, event providers are often programs or program modules operating in user mode in a computer system. Event providers are typically notified of the occurrence of events by "event-detection components", which is defined herein to include operating systems and drivers operating in kernal mode and other instrumentation for directly measuring, monitoring, or detecting events in computers, computer networks, or the environment of a computer system. The term "computer system" extends to any computer or computer network, either alone or in combination with peripherals or other hardware.

As used herein, the term "reporting" in reference to events includes the act of notifying a hardware or software component of the occurrence of one or more events. Delivering notification of the occurrence of an event from an event-filtering component to an event subscriber and publishing events by event providers are both examples of event reporting.

Figure 3:
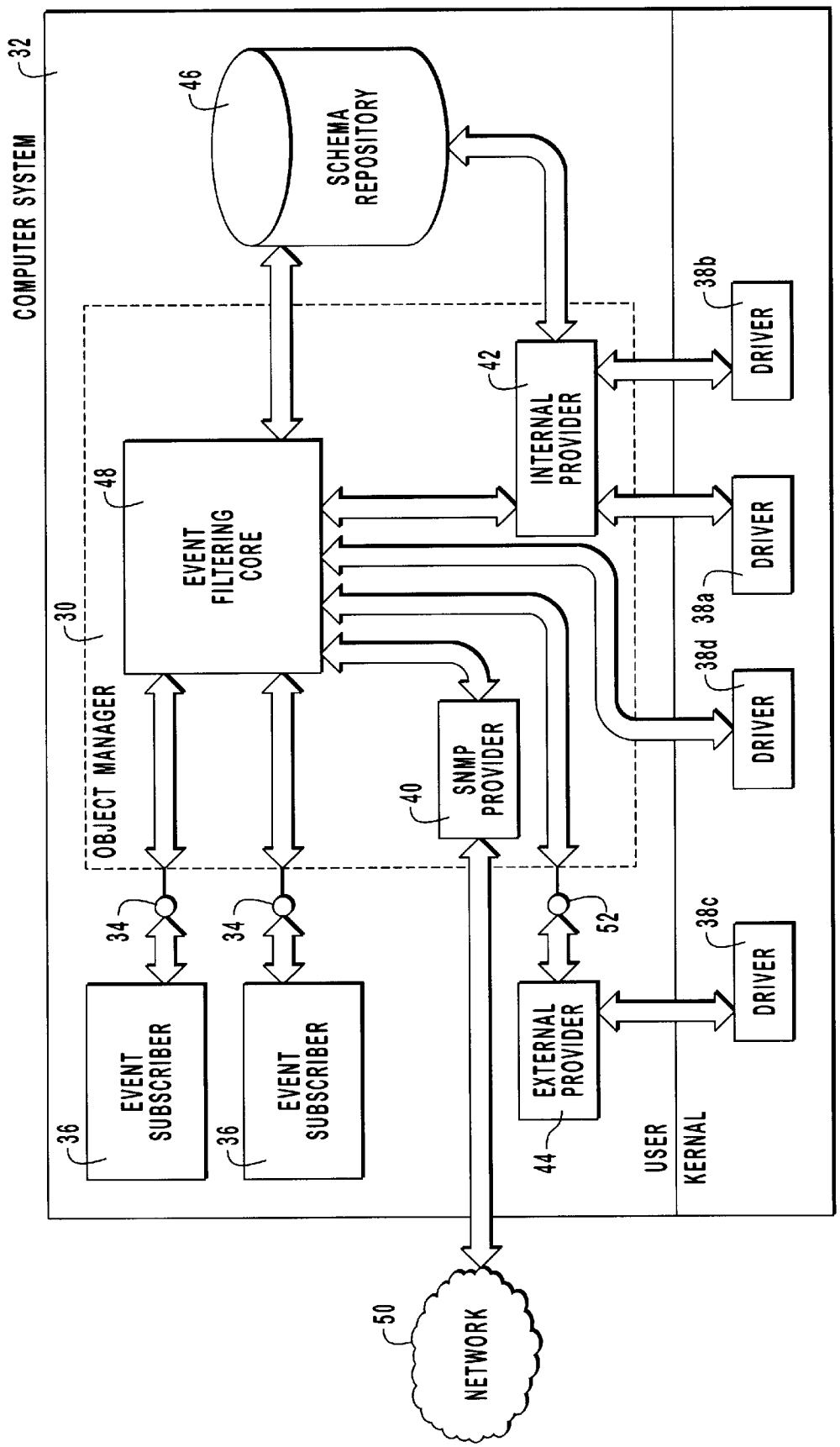
FIG. 3 is a schematic diagram illustrating a system of the invention for filtering events detected in a computer system and reporting the filtered events to an event subscriber.

FIG. 3 is a schematic diagram depicting one embodiment of the invention in which a computer system includes an object manager providing a standard interface for event subscribers and event providers. Object manager 30 of computer system 32 has a standard interface 34 through which it can communicate with one or more event subscribers 36. In this embodiment, object manager 30 has another standard interface 52 through which it can communicate with one or more external event providers 44. The occurrence of events is reported to an event-filtering core 48 of object manager 30 by drivers 38, SNMP provider 40, internal event provider 42, external event provider 44, or other instrumentation.

SNMP provider 40 reports the occurrence of events on a network, such as network 50, using a standard protocol well-known in the art. Internal provider 42 is internal in the sense that it is integrated with object manager 30 and can communicate with other components of the object manager without the use of a communications hub or similar hardware. In this example, SNMP provider 40 is another example of an internal event provider. When object manager 30 is practiced in a Windows NT environment, lor example, internal providers 42 can include Win32 event providers and Windows Management Instrumentation (WMI) providers.

Although object manager 30 may be equipped with internal providers 42 as described above, the invention is particularly useful for reporting events detected by one or more external event providers 44. External event provider 44 is external in the sense that it communicates with the object manager 48 via a communications link and a standardized interface 52. External provider 44 may be written by a manufacturer different from the supplier of object manager 30. In this manner, any original equipment manufacturer (OEM) can extend the driver that controls the function of its hardware to include an external event provider 44 that can communicate with object manager 30 via standardized interface 52. Indeed, object manager 30 and event-filtering core 48 allow events to be efficiently reported to event subscribers 36 without the manufacturers of external providers 44 and the manufacturers of the event subscribers having a detailed knowledge of one another.

As shown in the example of FIG. 3, events detected by event drivers 38a and 38b are reported to event-filtering core 48 by internal provider 42. Events detected by event driver 38c are reported by external provider 44, while events occurring on network 50 are reported by SNMP provider 40. Drivers 38a–d are examples of event-detection components. The systems of the invention can also report events detected by drivers or other instrumentation without the assistance of intermediate event providers in a polling operation that is discussed in greater detail below. For example, driver 38d has no associated event provider. Instead, object manager 30 periodically communicates directly to driver 38d to learn of the occurrence of events detected thereby.

In one embodiment of the invention, a schema repository 46 defines an object-oriented, hierarchical classification of event classes. The event classes allow event-filtering core 48 to efficiently determine the scope of the events that are to be reported to event subscribers 36 and the events that may be reported by event providers 40, 42, and 44. The Common Information Model (CIM), which is an industry standard for classifying data established by the Desktop Management Task Force (DMTF), is just one example of a suitable schema for use with the invention. Event classifications are described in greater detail below in reference to FIG. 4.

Event providers 40, 42, and 44 send notifications to event-filtering core 48 of the occurrence of events, and the event-filtering core then filters the events to identify those that are to be reported to one or more of the event subscribers 36. In one embodiment, the filtering is conducted by comparing the event classes of the events and parameters of the events to event-filtering definitions, which can be written in a query language. The event classifications defined in schema repository gives context to query-based filtering definitions, thereby allowing event-filtering core 46 to filter the events. Event filtering is described in greater detail below in reference to FIGS. 5A–9.

Event Classification

Figure 4:
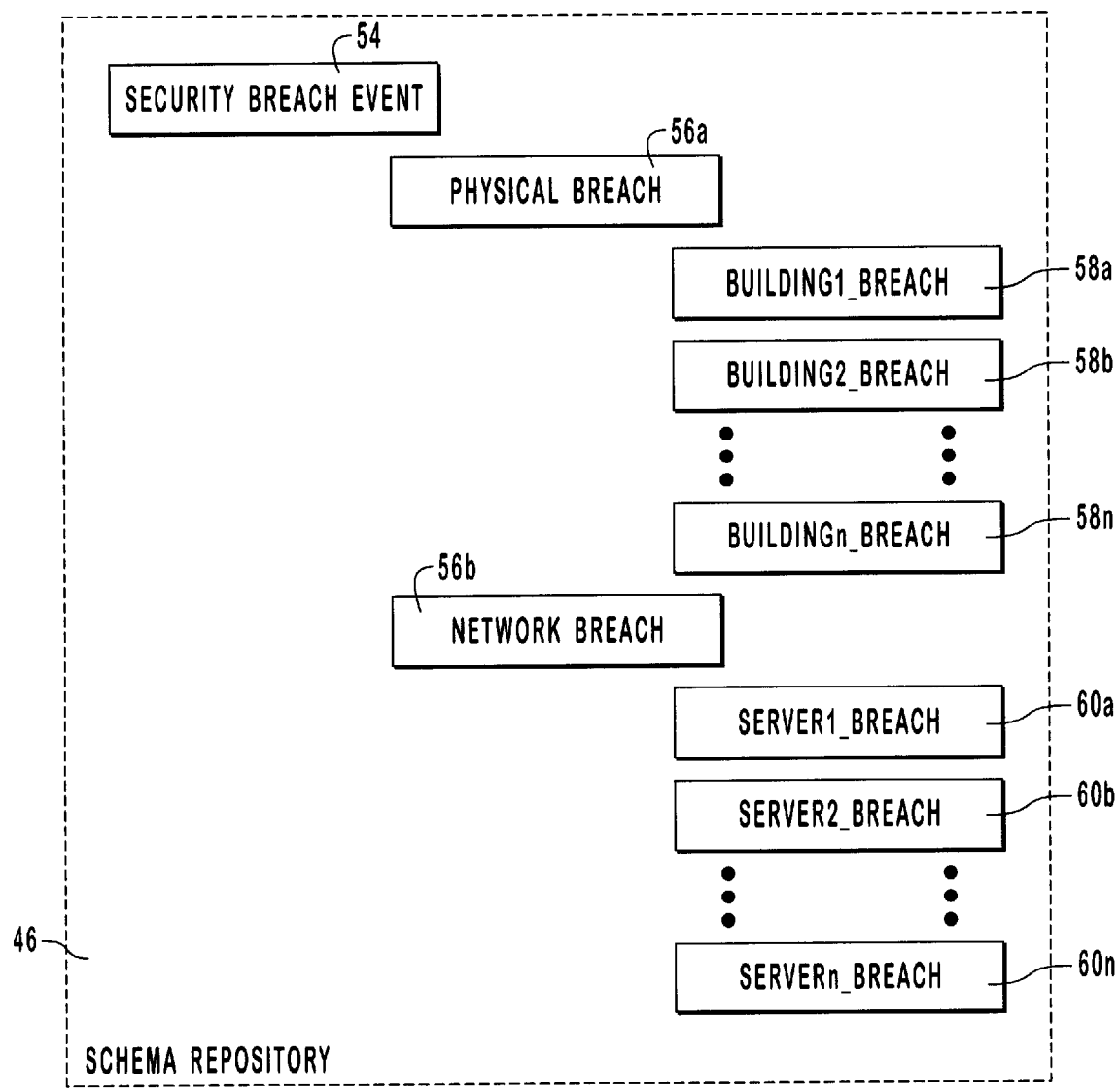
FIG. 4 shows an example of a portion of a schema that defines a hierarchical classification of event classes.

As shown in FIG. 4, embodiments of the systems of the invention include a schema repository 46 that defines an object-oriented, hierarchical classification of event classes. The classification defined in schema repository 46 may be very similar in structure to schema defining relational database objects. In one embodiment, each event that is reported to event-filtering core 48 of FIG. 3 belongs to one or more event classes defined in a schema repository 46. Accordingly, the event classes defined in schema repository 46 comprehend a set of possible events that can be reported to event-filtering core 48 by event providers 40 42, and 44 or by other sources.

Figure 5A:
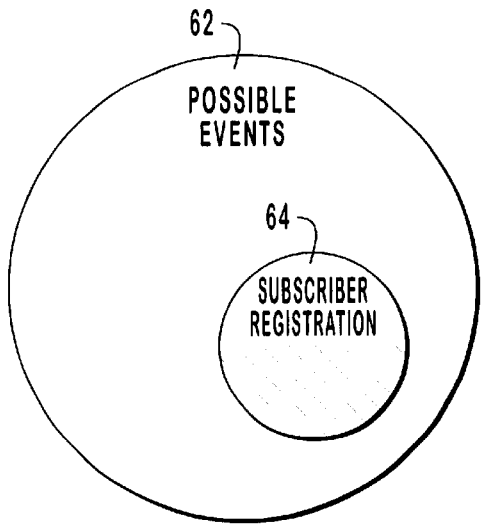
FIG. 5A is a Venn diagram depicting a set of possible events and a subset of events to be reported to an event subscriber.
Figure 5B:
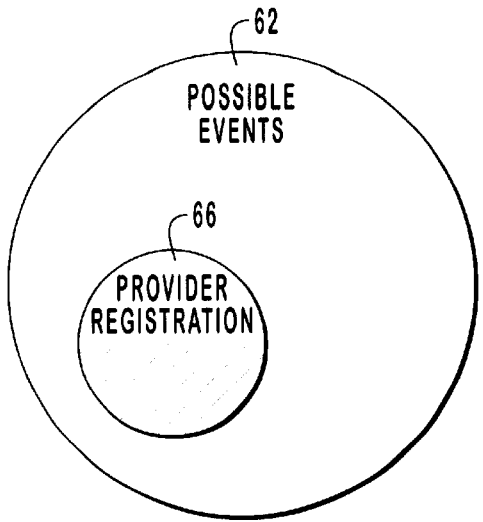
FIG. 5B is a Venn diagram illustrating a set of possible events and a subset of events to be detected and reported by an event provider.
Figure 5C:
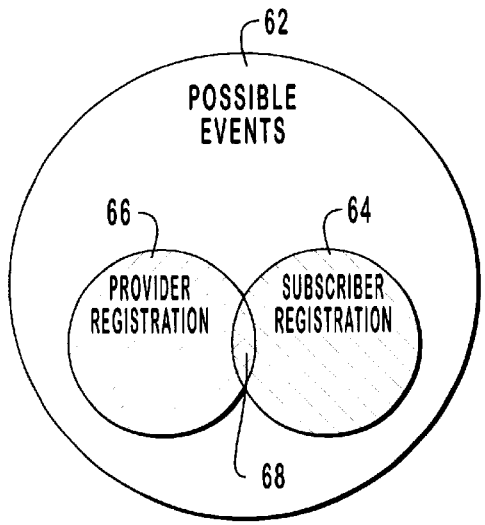
FIG. 5C is a Venn diagram illustrating the intersection of the subset of FIG. 5A and the subset of FIG. 5B.
Figure 5D:
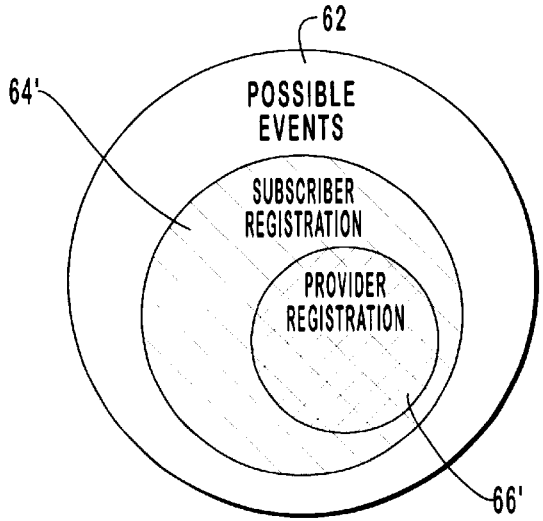
FIG. 5D is a Venn diagram illustrating a subset of events reported by an event provider that is subsumed by a subset of events to be reported to an event subscriber.
Figure 6:
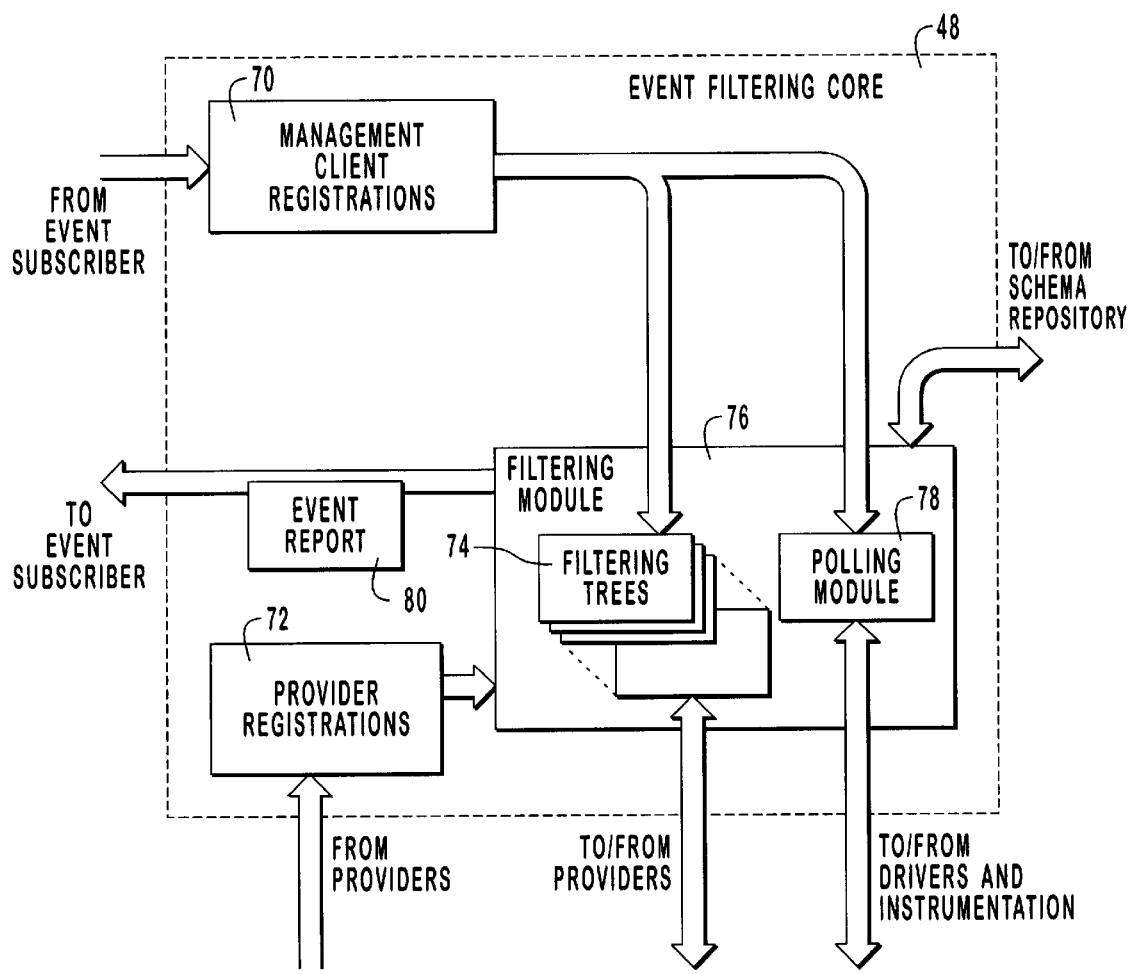
FIG. 6 is a schematic diagram further illustrating elements of the event-filtering core of FIG. 3.

As will be further discussed in reference to FIGS. 5A–6, event definitions, which may be written in query language, define a subset of the set of possible events comprehended by the event classes defined in a schema repository 46 of FIG. 4. A schema defined in schema repository 46 of FIG. 4 may be as detailed as desired and can be constructed to relate to the types of events that are to be detected by the computer system. As noted herein, the CIM schema or an extension thereof can be used with the invention. The schema can instead be defined by the entity that creates object manager 30 or can be an extension of a previously existing schema. In order for event subscribers 36 and event providers 40, 42, and 44 to be compatible with the systems of the invention. regardless of their manufacturers, it can be useful to publish any particular event classification that is used in a system operating according to the invention.

To illustrate the structure of an event classification, FIG. 4 includes a portion of a classification directed to the detection of security breaches in buildings or networks. It should be understood that the event classes illustrated in FIG. 4 are presented for illustration purposes only and that the event classes in any particular system can be selected to include the types of events to be detected by the computer system.

A first level event class 54 is defined in this example as SecurityBreachEvent. Two second level, children event classes 56a and 56b depend from a parent event class 54. In this example, event class 56a is defined as PhysicalBreach and event class 56b is defined as NetworkBreach. Event class 56a is itself a parent with respect to third level, children event classes 58a–n, which are defined as Building1-n__Breach, respectively. Likewise, event class 56b is a parent to third level, children event classes 60a–n, which are defined as Servers1-n__Breach, respectively.

In this embodiment, each event class can be defined to have any desired parameters. For example event classes 58a–n (Buildin1-n__Breach) can each be defined:

Class Building[X]__Breach          C1)

sint 32 Entrance
string ReponsibleParty

In the foregoing example [X] represents the number of the building. The parameters "Entrance" (signed integer) and "ResponsibleParty" (string) are associated with event classes 58a–n (Building1-n__Breach). Accordingly, when an event belonging to one of event classes 58a–n is reported to event-filtering core 48, the instance of the event includes arguments representing the values of the parameters Entrance and ResponsibleParty.

As event providers 40, 42, and 44 notify event-filtering core 48 of the occurrence of the events dealing with security breaches, each event will belong to at least one of the event classes illustrated in FIG. 4. For example, if a system operating according to the invention detects an event consisting of a breach of security in building 2, that event belongs to event class 58b. Because event class 58b is a child of event class 56a, which in turn is a child of event class 54, the detected event also belongs to event classes 56a and 54.

Event-Filtering and Event-Reporting Definitions

In order to filter the events reported from event providers 40, 42, and 44 to select the events to be reported to event subscribers 36, event-filtering core 48 maintains, in one embodiment of the invention, event-filtering definitions associated with each event subscriber. While the event-filtering definitions can be any mechanism for selecting only the events to be reported to particular event subscribers 36, in one embodiment the definitions are constructed in a query language written in the context of the event classification stored in schema repository 46. Any query language can be used according to the invention. By way of example and not limitation, the query language may be Structured Query Language (SQI), which may be modified or extended as desired.

In the Venn diagram of FIG. 5A, the set of possible events 62 includes the events comprehended by the event classes of the event classification. In reference to the schema in the example of FIG. 4, the set of possible events 62 of FIG. 5A includes at least any security breach event. In general, depending on the types of drivers, event providers, or other instrumentation associated with the computer system, the occurrence of any of the possible events 62 can be reported to the event-filtering core.

In this embodiment, each event subscriber 36 registers with the event-filtering core 48 by providing a subscriber registration 64 that includes the associated event-filtering definition, thereby indicating which events are to be reported to the event subscriber. In other words, the event-filtering definition designates with of the possible events are subscriber-requested events. As shown in FIG. 5A, subscriber registration 64 defines a subset of the set of possible events 62. As used herein, "subset" can be smaller or coextensive with the set in which it is subsumed.

In one example, subscriber registration 64 may comprise the event-filtering definition:

select*from SecurityBreachFvent.     Q1)

In this case, event-filtering core 48 would interpret the event-filtering definition as a request to receive a report of the occurrence of any event belonging to class 54 of FIG. 4. Accordingly. when event-filtering core 48 receives, from any event provider, a report of an event belonging to event class 54 or any of the children event classes 56a, 56b, 58a–n, or 60a–n, the event is reported to the event subscriber associated with the definition. As shown 24 in FIG. 5A, the subscriber registration subset 64 associated with the foregoing eventl)ocCket filtering definition would include all of the possible events 62 that are classified under event class 54 or any of its children classes.

The event-filtering definition:

select*from Building2_Breach     Q2)

where Entrance>3
limits the requested subset of events 64 to those belonging to event class 58b (Building2_Breach) and having an Entrance parameter greater than 3 (e.g. indicating that the security of an entrance # 4, 5, 6 . . . or n of Building 2 has been breached). Events not satisfying the "where" clause of query Q2 or, in other words, those not having an a value of the Entrance parameter that satisfies the where clause, do not belong to the subset of events defined by query Q2 and are not reported to the associated event subscriber.

In one embodiment of the invention, each event provider 40, 42, and 44 also registers with event-filtering core 48 by supplying a provider registration 66 that includes an associated event-reporting definition, thereby guaranteeing to the event-filtering core that any event reported by the particular event provider will satisfy the definition. Like the event-filtering definitions, the event-reporting definitions can be written in the query language. Referring to FIG. 5B, the event-reporting definition of the provider registration defines a subset 66 of the set of possible events 62.

For example, provider registration 66 may comprise the event-reporting definition:

select*from NetworkBreach     Q3)

which indicates that any event reported by the associated event provider will belong to event class 56b or to any of the children classes 60a–n.

The event-reporting definition:

select*from Building2_Breach     Q4)

where Entrance<5
indicates that the associated event provider will only report events belonging to class 58b (Buildino2_Breach) and having an Entrance parameter less than 5 (e.g., indicating that the security of an entrance # 1, 2, 3, or 4 of Building 2 has been breached).

In another example, an event subscriber could register the following event-filtering definition with the event-filtering core:

select*from SecurityBreachEvent     Q5)

where (Building<>8 and Severity<3) or Severity<2
In this example, event class SecurityBreachEvent is associated with parameters Severity and Building. This query specifies that the associated event subscriber is to be notified of security breach events having a Severity parameter value of 1 or 2 in all buildings other than building 8, and of security breach events having a Severity parameter value of 1 in building 8.

In order to further illustrate the capabilities of the query-based event-filtering definitions, the additional examples are presented below. In the following discussion, "instrinsic" events include those that relate to the creation of data with respect to the configuration of a computer or a computer network. For example, events consisting of the installation, deinstallation, or modification of a hardware or software components are intrinsic, since their occurrence causes the configuration of the system to change. In contrast "extrinsic" events are those that relate to activity in or in the environment of a computer or computer network, but do not relate to the configuration of the computer or computer network. Examples of extrinsic events include disk drive activity and errors network server activity and failure, and security breaches.

In order to monitor installation, deinstallation, and modification of hardware and software components, the event classification in the schema repository could be supplemented with intrinsic event classes directed to the installation, deinstallation, and modification of hardware and software components. Intrinsic event classes could be defined as follows:

class InstanceCreationEvent (C2)

object TargetInstance;

class InstanceDeletionEvent object TargetInstance (C3)

where TargetInstance is a parameter of the classes InstanceCreationEvent and InstanceDeletionEvent, and which has, as its value, an object-oriented data class specifying the hardware component or software component installed.

Data classes could be defined as follows:

class Win32_Modem; (C4)

class Video_Card; (C5)

class Win32_Service; (C6)

and so forth, each being associated with the specified hardware or software component. Moreover, the data classes can be associated one with another in parent/child relationships. For example, each data class that relates to a hardware component can have child classes specifying particular manufacturers.

In one example, an event subscriber could register the event-filtering definition:

select*from_InstanceCreationEvent (Q6)

where TargetInstance is a "Win32_Modem" and (TargetInstance.Manufacturer="USRobitics" or TargetInstance.Manufacturer="Hayes")

The foregoing query illustrates the use of an operator "isa", which associates a parameter of the event class with a selected data class. In this example, the operator "isa" associates the parameter TargetInstance with the specified data class Win32_Modem. This query would result in the event subscriber being notified of the installation of Win32 modems manufactured by US Robotics or Hayes.

In yet another example, an event subscriber could register the event-filtering definition:

select*from InstanceDeletionEvent (Q7)

where TargetInstance isa "Win32_Service" and not TargetInstance.State="Running"

The foregoing query specifies that the event subscriber is to receive notification of the deinstallation of a Win32 service that is not in a running state.

The event-filtering definitions and event-reporting definitions facilitate the filtering of events as they are received from the event providers. Referring to FIG. 5C, the intersection 68 of subsets 64 and 66 represents for example, the events defined by query-based definitions Q2 and Q4, above. In particular, query Q2 (i.e., subset 64) specifies that any event associated with a security breach of an entrance # 4, 5, 6 . . . or n of Building 2 is to be reported to the associated event subscriber 36. Similarly, query Q4 (i.e., subset 66) indicates that the associated event provider will report only security breaches of an entrance # 1, 2, 3, or 4 of Building 2. The intersection 68 of queries Q2 and Q4 indicates in this example that when an event of a security breach of entrance 4 of Building 2 is reported by the event provider, that event is reported to the event subscriber. If other events requested by the event subscriber are to be reported (e.g., breach of entrance 5, 6 . . . n of Building 2), the event must be detected by another event provider.

The event-reporting definitions associated with the event providers can greatly simplify the filtering process in many cases. For example, consider an event subscriber associated with query Q1 and an event provider associated with query Q3. In this case, as illustrated by FIG. 5D, the subset of events 66' that satisfy query Q3 are subsumed within the subset of event 64' that satisfy query Q1. In this case, any event supplied by the event provider necessarily satisfies the event-filtering definition associated with the event subscriber. Accordingly, the event-filtering core 48 does not need to analyze the particular parameters or event class of the event provided according to query Q3, but instead can always report the event to the event subscriber.

Furthermore, the event-reporting and event-detecting definitions allow event providers 40, 42, and 44 to be activated only when there is an event subscriber 36 interested in receiving reports from the event provider. For example, consider a situation in which only queries Q2 and Q3 are registered with the event-filtering core 48. In this case, there is no event subscriber 36 registered with event-filtering core 48 that is interested in any event that could be reported by the event provider associated with query Q3. In particular, the event subscriber associated with query Q2 is not interested in learning of any event classified under event class 56b (NetworkBreach) or any of its children event classes 60a–n (Server1–n_Breach). Accordingly, the particular event provider is not activated until such time that an interested event subscriber registers with the event-filtering core.

FIG. 6 is a schematic diagram further illustrating features and elements of event-filtering core 48 of FIG. 3. Referring to FIG. 6, event-filtering core 48 includes, according to one embodiment of the invention, an event subscriber registrations repository 70 and a provider registrations repository 72. When event-filtering core 48 is initialized on a computer system or when an event subscriber 36 is installed, the event subscriber registers an event-filtering definition, examples of which are queries Q1 and Q2 discussed above. Likewise, event providers 40, 42 and 44 register at provider registrations repository 72, an event-reporting definition, examples of which include queries Q3 and Q4.

In this embodiment, event-filtering core 48 assembles one or more filtering trees 74 or another suitable filtering mechanism in filtering module 76. Filtering trees 74 constitute an example of means for comparing a reported event against one or more event-filtering definitions associated with event subscribers. Filtering trees 74 or the other filtering mechanism used in the invention are assembled using the event classes defined in the schema repository. Each event provider can have one dedicated filtering tree 74 defined in filtering module 76. After comparing the reported events against the event-filtering definitions using filtering trees 74, any events satisfying the event-filtering definitions result in an event report 80 being sent to the appropriate event subscriber or subscribers.

In cases where no event provider exists on the computer system for notifying eventfiltering core 48 of the occurrence of the particular events, a polling module 78 actively identifies when the particular events have occurred. For example, if a computer system includes a disk drive without an associated event provider and an event subscribers has requested a report of events at the disk drive, polling module 78 may periodically determine whether events of interest have occurred at the disk drive.

Figure 7:
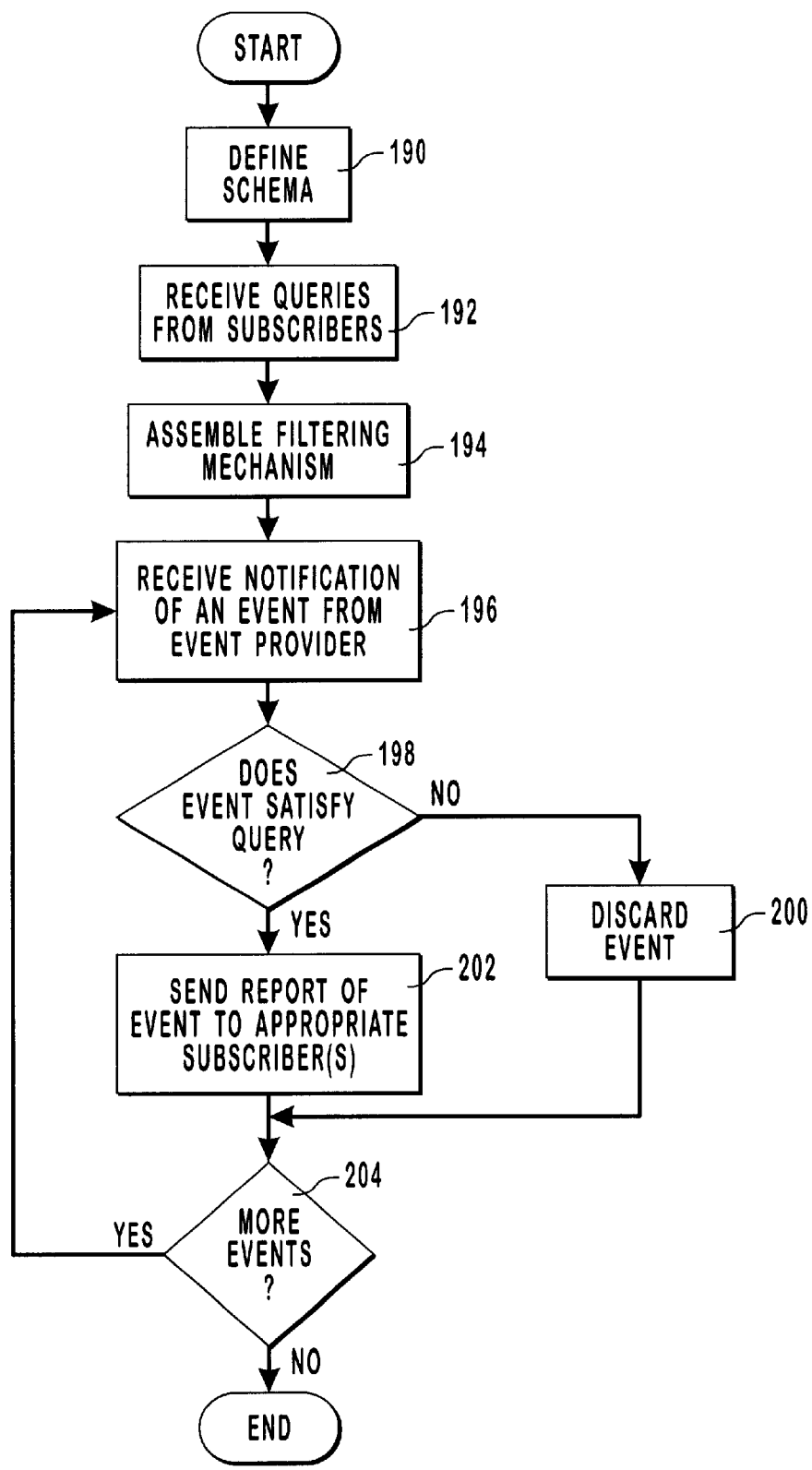
FIG. 7 is a flow diagram illustrating a method for filtering a plurality of events reported by event providers to identify the events to be reported to an event subscriber.

FIG. 7 depicts the steps of one embodiment of the methods for filtering events using, for example, the structure and event classifications illustrated in FIGS. 2–6. In step 190, the schema that organizes the hierarchical classification of event classes is defined according to the methods described herein. In step 192, the event-filtering core receives and registers queries from subscribers defining the subsets of events to be reported thereto. In step 194, the event-filtering core assembles a filtering mechanism based on the queries received from the subscribers and the event classification defined in the schema. Once the filtering mechanism is in place, event providers associated with the computer system provide notification of an event as illustrated by step 196.

According to decision block 198, the system determines whether the event detected in step 196 satisfies one or more queries associated with the event subscribers. If the event does not satisfy any query, the event is discarded in step 200 without being reported to an event subscriber. If, however, the event satisfies one or more of the queries, a report of the event is sent to the appropriate event subscriber or subscribers as illustrated by step 202. As shown in decision block 204, the method can continue detecting and reporting events as desired.

Time-Sensitive Event Filtering and Grouping
1. Event Aggregation

Figure 8:
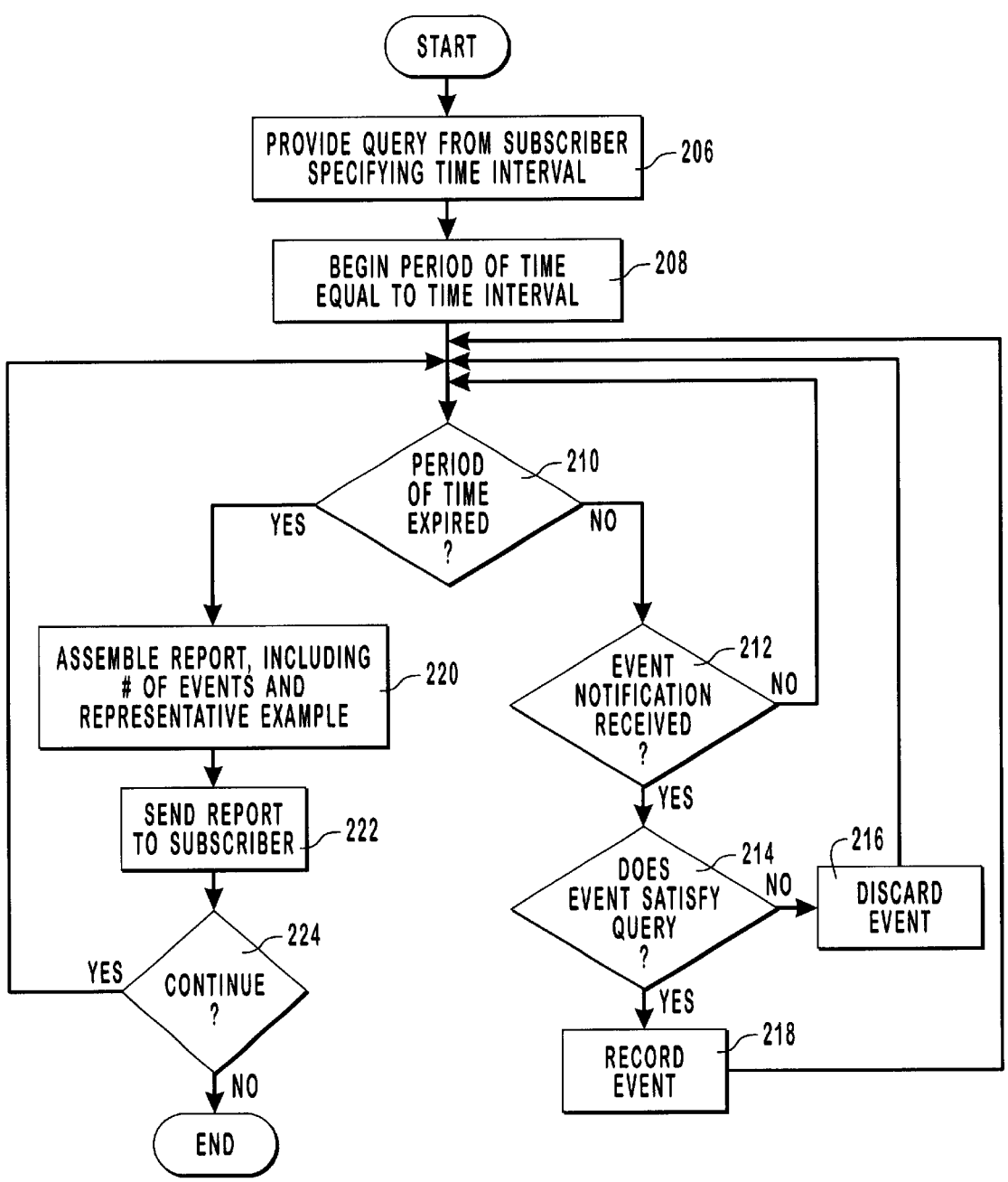
FIG. 8 is a flow diagram depicting a method for generating a report of events detected over a period of time, wherein the report is to be provided to the event subscriber.
Figure 9:
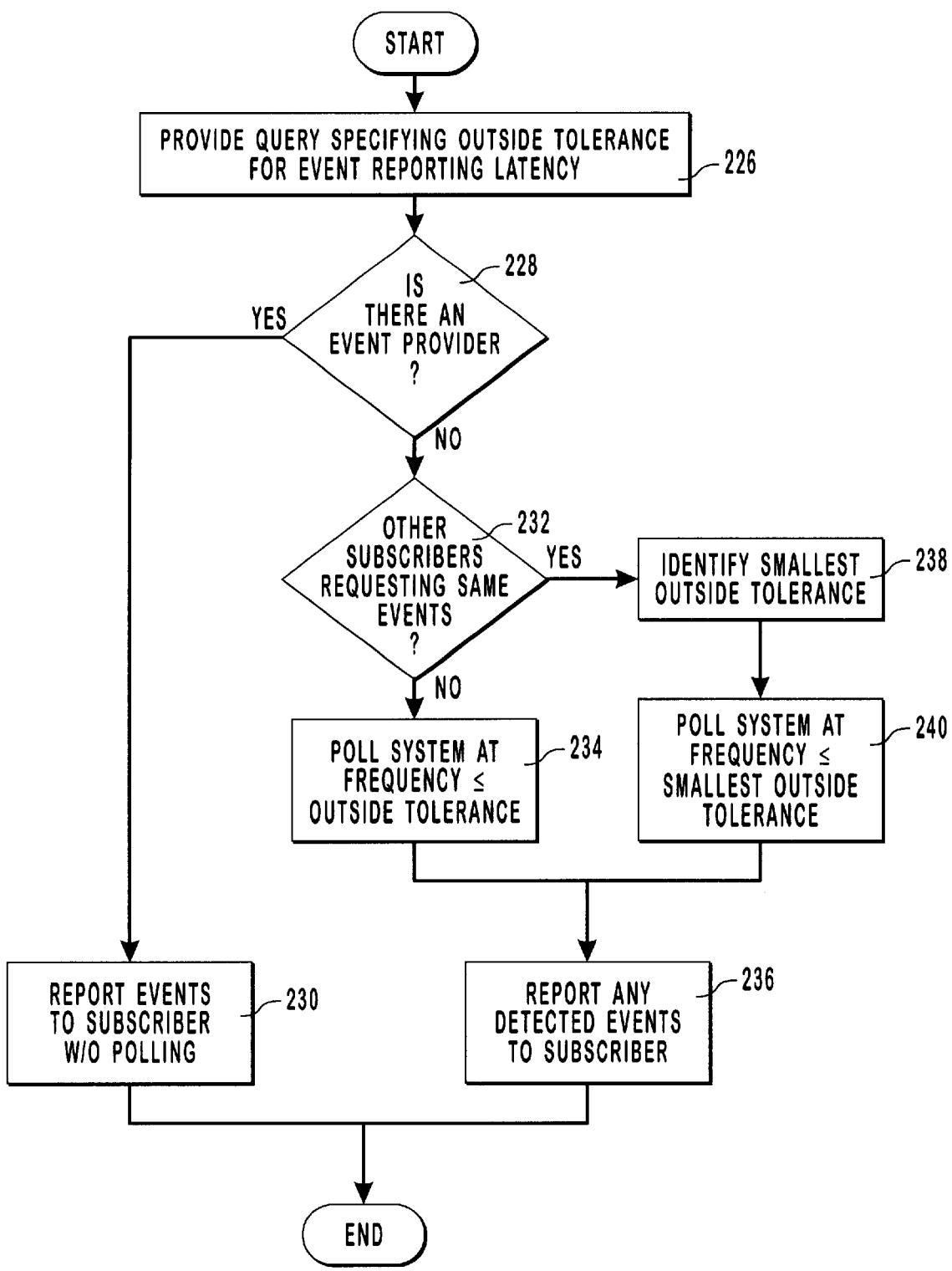
FIG. 9 is a flow diagram illustrating a method whereby the occurrence of a selected event is reported to the event subscriber within a period of time after its occurrence that is no greater than a maximum event reporting latency specified by the event subscriber.

FIGS. 8 and 9 depict methods whereby events are filtered, grouped, or both, based on the time that the events occur using a query language, such as SQL, that has been extended to include time-functional syntax. For example, some event subscribers may need only periodic reports or summaries of events that have occurred in a computer, a computer network, or in the environment of a computer system. An event subscriber may be interested to receive a report each day of the number of security breaches in a building. The event-filtering definition associated with such an event subscriber may be constructed:

select*from Building1_Breach                                Q8)

group
      within 86400 by Entrance

This event-filtering definition indicates that the event subscriber is to receive a daily summary (every 86,400 seconds) of the number of security breaches in Building 1. The summary will group the events by the value of the parameter Entrance.

Another event subscriber might register an event-filtering definition:

select*from NetworkBreach                                    Q9)

group
      within 3600 having number of events >10

This definition indicates that the event subscriber is to receive an hourly summary (every 3,600 seconds) of the number of network security breaches, but only if the number within the hour has been greater than 10. The foregoing examples are presented for illustrative purposes, and the queries in any particular situation may be as broad or narrow as desired.

FIG. 8 depicts a method for reporting and grouping events according to a query similar to query Q8. In step 206, the event subscriber registers an event-filtering definition that, like query Q8, requests only a periodic summary of the events satisfying the query. The event-filtering definition can include a time interval for the periodic reporting, which in the example of query Q8 is 86400 seconds.

Including the time interval in the query is particularly useful, for example, in situations where events happen relatively frequently and reporting individual events would generate considerable data traffic within the system. Instead, periodic summaries are generated according to this technique, thereby potentially significantly reducing the amount of data to be transmitted. The time interval is also useful when a summary of events is more manageable than real-time reports.

In step 208, the event-filtering core begins monitoring events during a period of time equal to the time interval specified in the query. According to decision block 210, if the period of time has not yet expired, the system continues to receive and monitor event notifications originating from the event providers. Decision block 210, along with decision block 212, indicates that the system continues to monitor events to be included in the summary so long as the period of time has not expired. As shown at decision block 212, if an event notification is received, the method proceeds to decision block 214, in which the event is compared to the event-filtering definition. If the event does not satisfy the definition, the method proceeds to step 216, in which the event is discarded, and the system continues to receive events. If, on the other hand, the event satisfies the query, the event is recorded in step 218 by the event-filtering core for later inclusion in the summary sent to the event subscriber. The routine comprising steps 210, 212, 214 216, and 218 is repeated until the period of time expires, at which point the method advances from decision block 210 to step 220.

In step 220, the event-filtering core assembles the report that includes, in one embodiment, the number of events that have been detected during the period of time. The report can further include a representative example of the summarized events. When the event-filtering definition include a "group" clause as does query Q9, the report can group the events in the defined manner. In step 222, the report is sent to the subscriber. If the event-filtering core is to continue detecting and reporting events, the method proceeds from decision block 224 to decision block 210 as shown in FIG. 8.

2. Polling

FIG. 9 illustrates a method whereby drivers or other instrumentation that do not have associated event providers are periodically polled by the event-filtering core to learn of the occurrence of events. The method of FIG. 9 can be particularly useful to detect installation, deinstallation, or modification of hardware or software components. In order to manage the polling frequency, the event-filtering definitions can specify an outside tolerance of the event reporting latency that is to be allowed to elapse between the occurrence of an event and the reporting of the occurrence to the event subscriber.

In one implementation, the systems of the invention may be used to monitor the installation of modems in a computer network. In this case, the event classification in the schema repository could be supplemented with intrinsic event classes directed to the installation, deinstallation, and modification of hardware components, such as classes C2 and C3, above. Moreover, classes C2 and C3 and other intrinsic event classes can have one more parameters that may have as their values particular data classes, such as classes C4–C6, defined above.

In this example, an event subscriber 36 could be associated with the event-filtering definition:

select*from InstanceCreationEvent within 3600           Q10)

where TargetInstance isa "Win32_Modem"

This event-filtering definition specifies that the event subscriber is to receive reports of the installation of Win32 modems. In particular, when the occurrence of an InstanceCreationEvent (i.e., installation of hardware) is detected, and the parameter of the event has the value of "Win32_Modem", the event subscriber is to be notified.

Because modem installations and other intrinsic events often occur relatively infrequently, it might be considered inefficient to frequently check for their occurrence. In addition, there may not be an event provider dedicated to monitoring the installation of modems or other hardware. Accordingly, the clause "within 3600" of query Q10 instructs the event-filtering core 48 to poll the computers in the computer network at a frequency of once every hour (3,600 seconds) or fewer if there is no event provider to report modem installations. For example, polling module 78 of FIG. 6 can be used to execute the polling operation according to one embodiment. Extrinsic events can also be detected and reported using the polling procedures disclosed herein.

It is noted that, in this embodiment, the "within" clause specifies an outside tolerance of the reporting latency. If another event subscriber has, for example, an event-filtering definition:

select*from InstanceCreationEvent within 1800    (Q11)

where TargetInstance isa "Win32_Modem"
the system of the invention will poll, if polling is necessary, at a frequency of once every 30 minutes (1,800 seconds) or fewer.

FIG. 9 illustrates one method for polling the components of the computer system based on event-filtering definitions that, like queries Q10 and Q11, define an outside tolerance for event-reporting latency. In step 226, the event subscribers register event-filtering definitions including an outside tolerance for event reporting latency. In step 228, the event-filtering core or another component determines whether the system includes an event provider that will report any occurrences of the specified events. If so, the method proceeds to step 230, in which no polling is necessary, and events are reported as otherwise described herein. In this case, no polling is necessary since it can generally be assumed that events will be reported to the event-filtering core 48 at rates faster than the outside tolerance of the event reporting latency.

If, however, there is no event provider, which may be the case with respect to the queries Q10 and Q11, the method advances from decision block 228 to decision block 232. For purposes of illustration, it is assumed that query Q10 has been registered in step 226. According to decision block 232, it is determined that query Q11 has also been registered. Thus, the method advances to step 238, in which the smallest outside tolerance is identified. In this example, query Q10 has an outside tolerance of 3,600 seconds, whereas query Q11 has an outside tolerance of 1,800 seconds. In step 240, the system is polled periodically at a time interval no greater than the smallest tolerance (1,800 seconds). Therefore, in step 236, any detected events that satisfy the queries can be reported to both event subscribers at a frequency of once every 1,800 seconds or fewer, thereby meeting the demands of both outside tolerances.

If there had only been one subscriber requesting the events, the method would have proceeded from decision block 232 to step 234. For example, if only query Q10 had been registered, the system would have been polled in step 234 at a frequency of once every 3,600 seconds or fewer.

Forward Custom Marshaling of Event Filters to Event Providers

Figure 10:
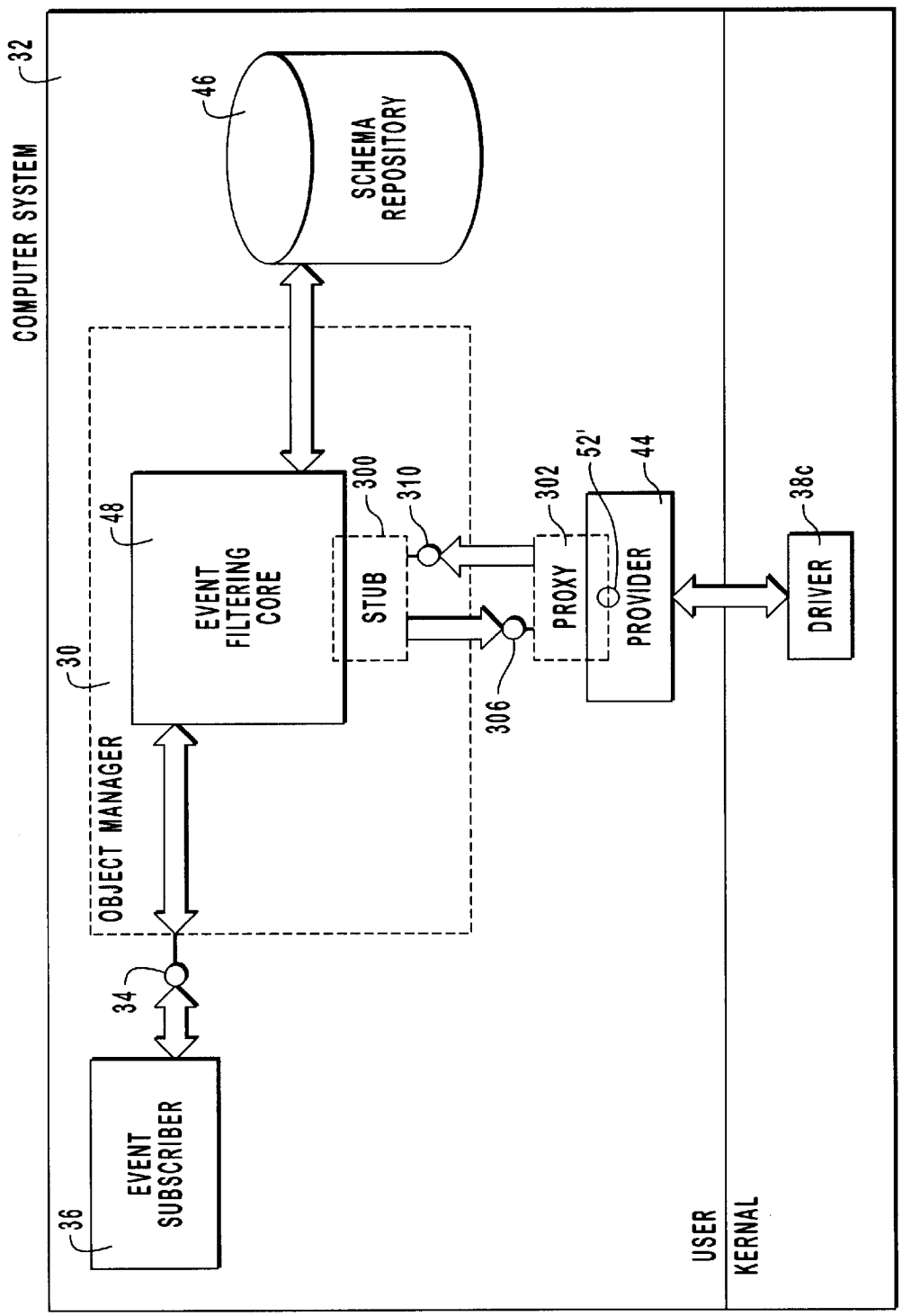
FIG. 10 is a schematic block diagram illustrating another embodiment of the system of the invention for filtering events detected in a computer system and reporting the filtered events to an event subscriber.

It will be appreciated that in certain situations, unnecessary data traffic occurs within the computer system as a result of event providers reporting event occurrences that end up being discarded by the centrally located event-filtering core 30. This unnecessary data traffic could potentially be problematic in an environment having a number of external event providers, such as provider 44 in FIG. 3. As discussed, when a provider detects the occurrence of an event, it reports that event to the event-filtering core 30. The event is then analyzed by the event-filtering core 30 in accordance with corresponding event-filtering definitions using the appropriate filter tree(s). If the event has been requested, it is forwarded on to the requesting subscriber(s). However, if was not requested, then it is simply discarded. It will be appreciated that in this latter case, the forwarding of the event from the event provider to the event-filtering core was ultimately an unneeded data transmission that utilized valuable computer processing and/or network resources. In some cases, the number of events that are ultimately discarded could be quite large. and eliminating the initial reporting of those events by the event provider could improve the performance of the computer system and/or network communications link. This situation and potential problem is addressed by yet another aspect of the present invention, example embodiments of which are shown FIGS. 10–12, to which reference is now made. FIG. 10 is a schematic block diagram depicting one alternative embodiment of the present invention. As was the case with the embodiment in FIG. 3, a computer system includes an object manager 30 that presents a standard defined programming interface for event subscribers and event providers. Also, the occurrence of events is reported to an event-filtering core 48 of object manager 30 by, for instance, an external event provider 44, or similar facility.

However, the embodiment illustrated in FIG. 10 is different from that shown in FIG. 3 in one primary respect. As discussed, the event provider of FIG. 3 reports all events to the event-filtering core 48, at least some of which may be discarded at that point. Those events that are reported, and then ultimately discarded, have used up computer system and/or network resources. In direct contrast, in the embodiment illustrated in FIG. 10 an event provider, such as that shown at 44, will only forward subscriber requested events to the object manager 30. Events not requested by a subscriber are simply discarded at the event provider 44, and thus never forwarded to the object manager 30, thereby saving system resources. This is accomplished by filtering the events at the provider 44, instead of at the event filtering core 48.

In the illustrated embodiment of FIG. 10, the filtering of events is performed by a executable program component referred to as a proxy procedure, or simply a proxy, shown at 302. Proxy 302 is custom forward marshaled to the provider 44 at the time of its activation by the object manager 30 and is done so in a manner such that the proxy 302 functions in the same executable space as the event provider 44. Moreover, the proxy 44 is written and implemented so as to provide the same common programming interface that is provided by the event filtering core in the embodiment of FIG. 3. This interface is represented at 52' in FIG. 10. In this way, the existence and functionality of proxy 302 is completely transparent to the event provider 44, which continues to report all events to the interface 52' in the manner previously described.

The executable program instructions that are used to implement the proxy component 302 provide the same filtering function that is performed at the event filtering core 48 in FIG. 3. Also, all event-filtering definitions and corresponding filter tree that pertain to event provider 44 are stored within proxy 302. In the same manner already described, the proxy 302 uses the filter tree to determine whether an event received by the provider 44 should be forwarded to the event filtering core 48 of object manager 30.

The event filtering core 48 communicates with the proxy 302 by way of dedicated communications links that are established between the proxy 302 and a stub procedure, executing at the event filtering core 48 and shown at 300. like the proxy, the stub procedure 300 is an executable program component invoked at the time the provider 44 is activated by object manager 30. Stub 300 and proxy 302 communicate via two specialized communications links, each of which is characterized by a defined interface, represented respectively at 308 and 310. Communication link utilizing interface 308 is used by stub 300 to forward event-filtering definitions that make up a filter tree residing in the proxy 302. It is also used to forward new event subscriber registrations of new event-filtering definitions that apply to provider 44, which are then incorporated into a filter tree by the proxy 302. Communications link utilizing interface 310 is used by proxy 302 to forward all subscriber requested events (i.e., those events received by provider 44 that are authorized as per the filter tree contained within proxy 302) to the event filtering core 48. Those events are then forwarded to the appropriate event subscriber.

Figure 11:
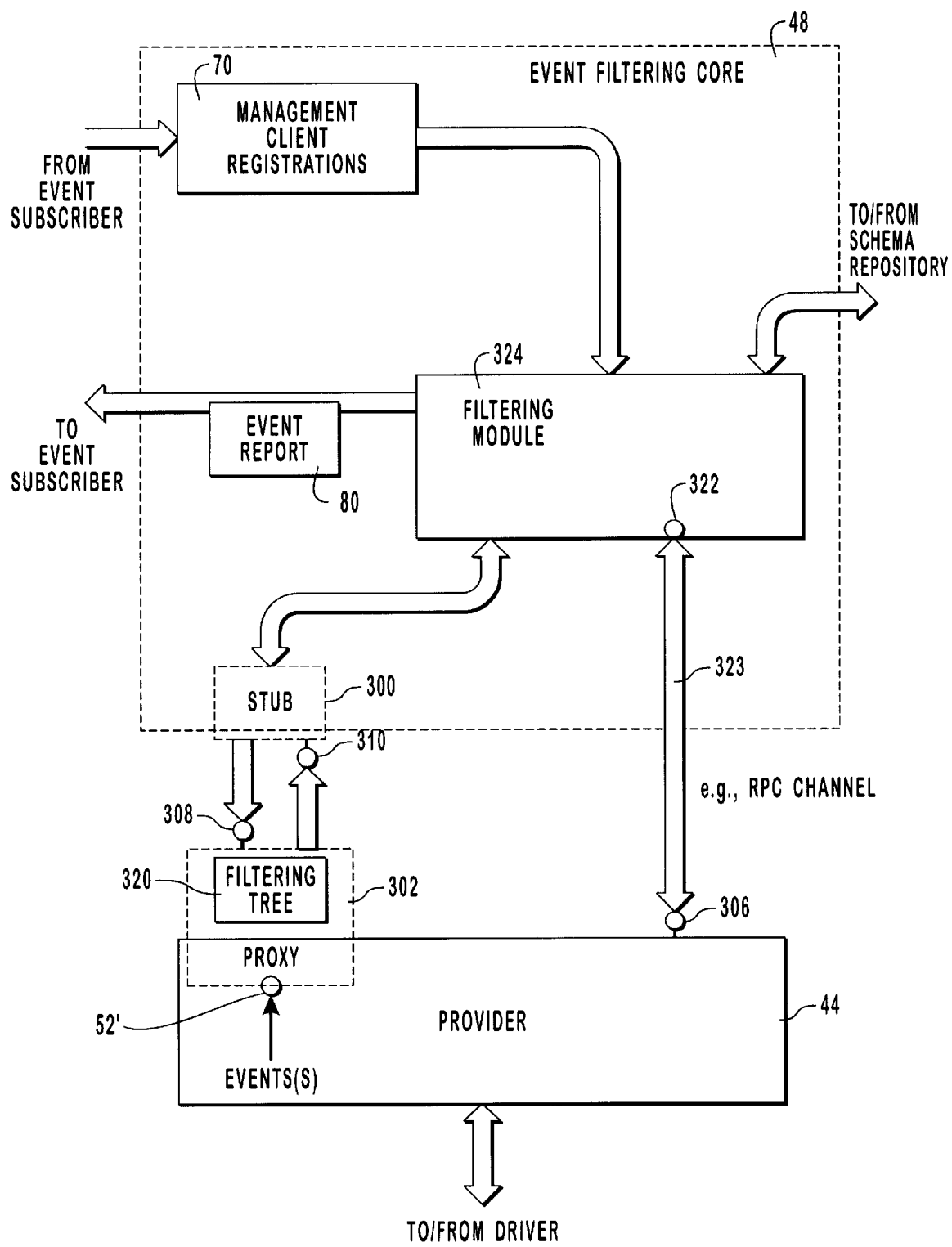
FIG. 11 is a schematic block diagram further illustrating elements of the event-filtering core and the stub and proxy procedures of FIG. 10.

FIG. 11 is a schematic block diagram further illustrating features and elements of event-filtering core 48, stub 300, proxy 302 and provider 44 components of FIG. 10. As before, event-filtering core 48 includes, according to one embodiment of the invention, an event subscriber registrations repository 70 and a provider registrations repository (not shown). When event-filtering core 48 is initialized on a computer system or when an event subscriber 36 is installed, the event subscriber registers an event-filtering definition.

In the example embodiment of FIG. 11, event-filtering core 48 assembles one or more filtering trees 74, or any another suitable filtering mechanism, in filtering module 324 in the manner previously described. However, in contrast with the embodiment described in connection with FIG. 6, the filter tree(s) are not implemented in the filtering module 324. Instead, each filter tree is passed to the appropriate proxy located at the corresponding event provider. Based upon the registrations received from event subscriber(s), event filtering core 48 identifies which provider(s) are needed for the requested events. If, for instance, a requested provider has not yet been activated, the event filtering core 48 will activate the provider, and implement the corresponding stub and proxy procedures. As is shown in the example of FIG. 11, the stub 300 then passes the corresponding filtering tree 320 to proxy 302 via interface 308. Thereafter, as event subscribers register new event requests, or cancel existing requests, the resulting event-filtering definitions are passed to proxy 302 via interface 308, and then implemented within filtering tree 320.

As already noted, the existence of proxy 302 is transparent to provider 44. As such, all events are reported by provider 44 to standard interface 52'. However, each event is then captured and evaluated by proxy 302. Only those events satisfying the filter tree 320 definitions are reported to the event filtering core 48 via stub 300 and communications interface 310. The filtering module 324 then causes an event report 80 to be sent to the appropriate event subscriber or subscribers.

FIG. 11 also schematically illustrates an example of how the proxy and stub procedures are implemented. In one preferred embodiment, event filtering core 48 activates an event provider such as 44 by way of an defined call made via the standard interface of the current invention, and a location pointer corresponding to the location of the event provider 44 is obtained. Preferably, an RPC-like channel 323 is established between a communication proxy at the filtering module 324 and a communication stub at provider 44 for subsequent implementation of proxy procedure 302 at provider 44. The communication proxy presents the provider's initialization interface 322 at module 324, and communication stub implements provider interface at 306. Also stub procedure 300 is invoked at event filtering core 48 for the benefit of provider 44.

Stub procedure 300 then requests that a proxy procedure 302 be created at provider 44. Proxy procedure is custom marshaled to event provider 44, and is invoked as a executable procedure at provider 44 in a manner so as to provide standard interface 52 to provider 44. Proxy 302 then establishes communication with stub 300 via defined interfaces 308 and 310. Thereafter, communication between provider 44 and event filtering core 48 is accomplished by way of proxy 302 and stub 300 and the dedicated communications links.

Figure 12A:
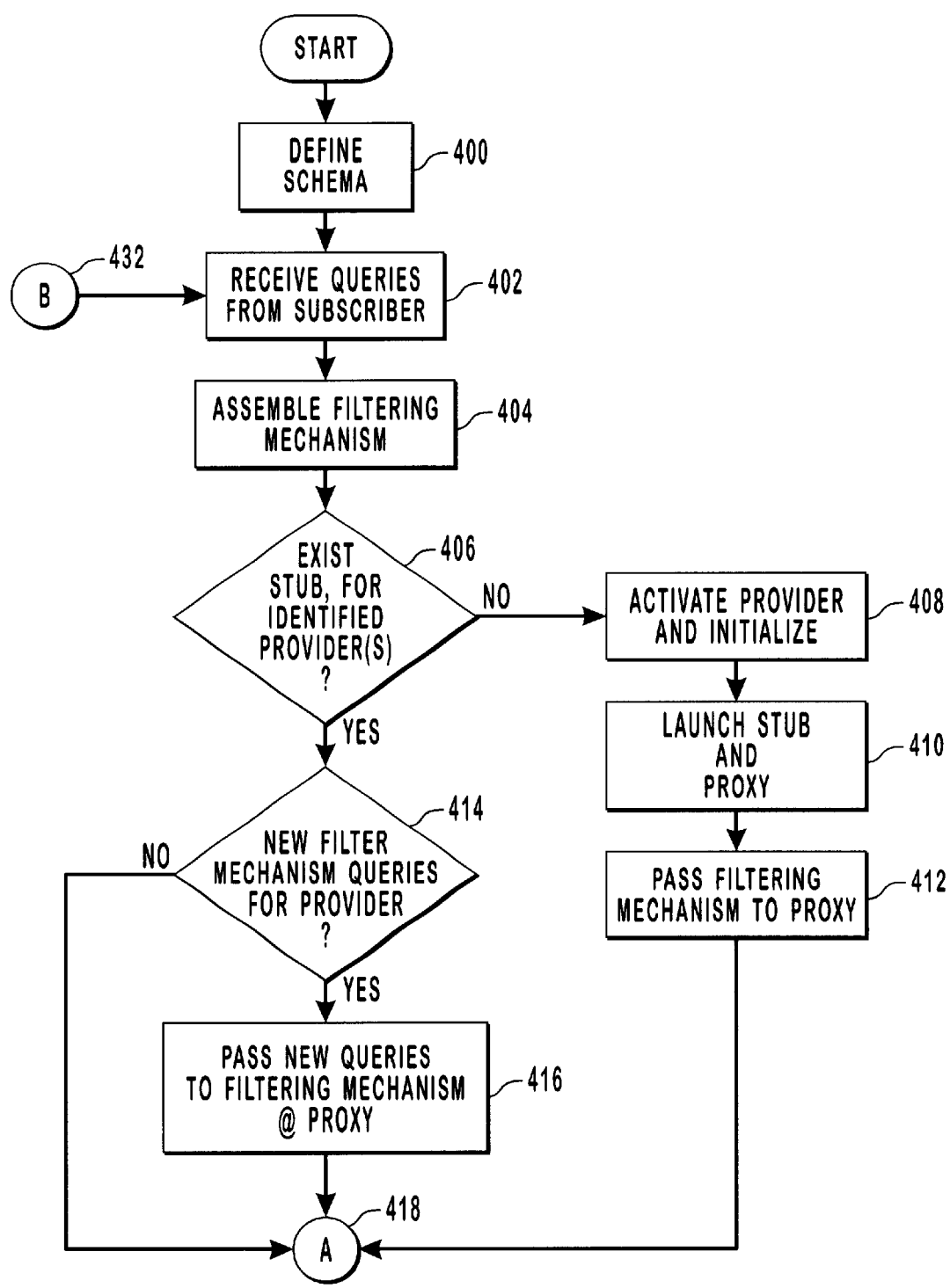
FIGS. 12A–12B is a flow diagram illustrating a method for filtering a plurality of events reported by event providers to identify the events to be reported to an event subscriber and wherein the filtering occurs at a proxy procedure that is associated with the event provider.
Figure 12B:
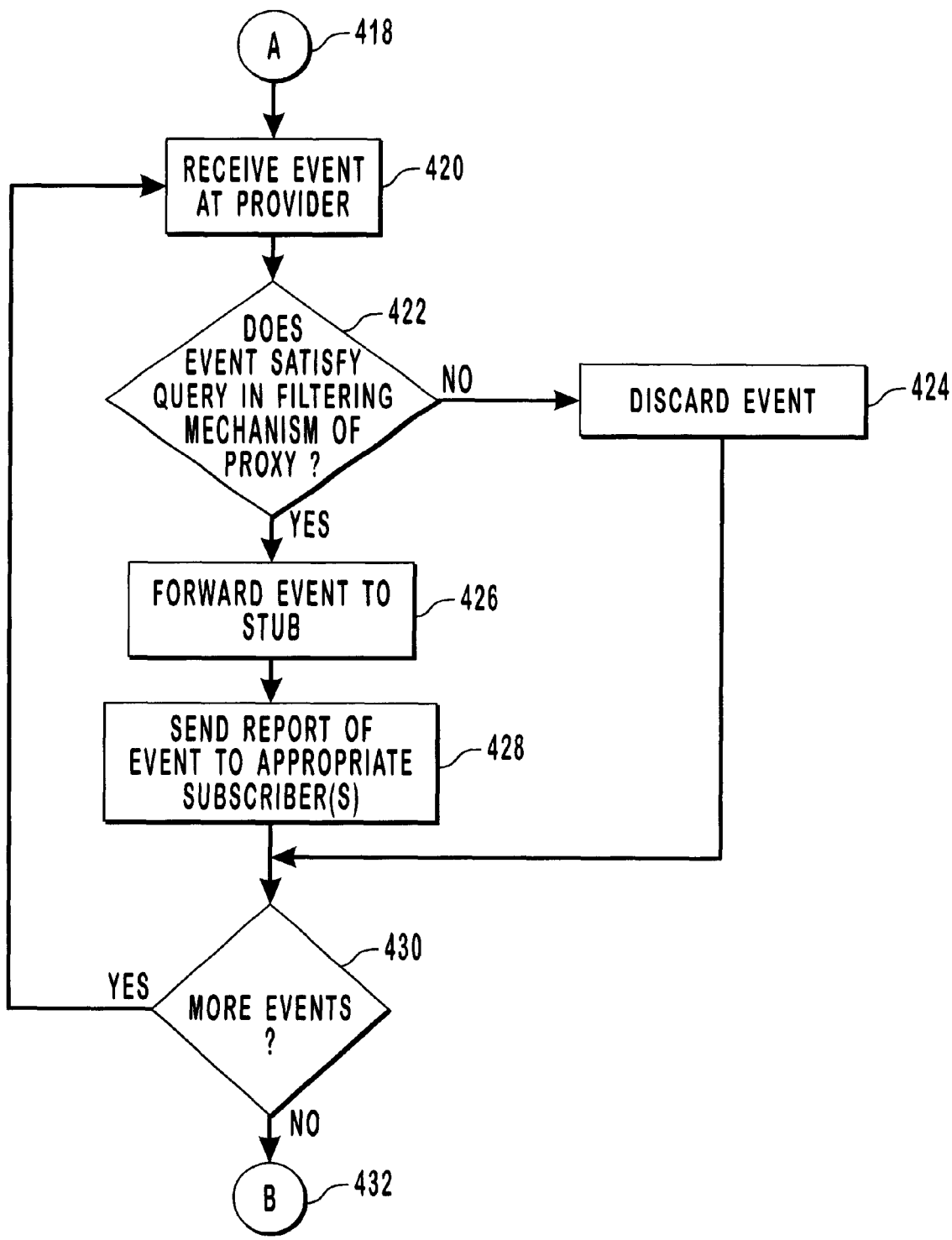

FIGS. 12A and 12B depict the program steps of one embodiment of the methods for filtering events using, for example, the structure illustrated in FIGS. 10–11. In step 400, the schema that organizes the hierarchical classification of event classes is defined according to the methods described above. In step 402, the event-filtering core 48 receives and registers queries from subscribers defining the subsets of events to be reported thereto. In step 404, the event-filtering core 48 assembles a filtering mechanism based on the queries received from the subscribers and the event classification defined in the schema.

At step 406, it is determined whether a stub procedure exists for the provider(s) corresponding to the events requested by subscribers. If not, the series of steps beginning at 408 are performed, which function so as to establish a stub procedure (such as 300) and a proxy procedure (such as 302) at the event filtering core and provider respectively. Thus, at step 408, the identified provider is activated and an RPC communications link is established between the filtering module and provider. At step 410, stub procedure 300 is invoked at event filtering core 48 for the benefit of provider 44. Then stub procedure 300 requests that a proxy procedure 302 be created at provider 44. Proxy procedure is custom marshaled to event provider 44, and is invoked as a executable procedure at provider 44, at which point communication is established between the proxy and stub. At step 412, the filtering, mechanism developed for that provider is passed to the provider's proxy. Processing then continues as indicated at 418.

If at step 406 it is determined that a stub already exists for the requisite provider(s), processing continues at step 414, where it is determined whether new queries have been specified for the provider by an event subscriber. If so, step 416 is performed, and the new query registrations are passed to the provider proxy, which then incorporates them into the existing filtering mechanism contained therein (i.e., filtering tree 320). If no queries have been registered by a subscriber at step 414, processing instead proceeds at step 418.

Reference is next made to FIG. 12B, which illustrates the processing steps beginning at 418. At step 420, the provider monitors the receipt of events. When an event is received, the provider passes it to the proxy via the standard interface (52' in FIG. 11). Proxy then determines whether the event detected satisfies one or more queries associated with the event subscribers, as defined in the filtering mechanism stored at the proxy. If the event does not satisfy any query, the event is discarded in step 424 without being passed to the event filtering core. If, however, the event satisfies one or more of the queries, the proxy forwards it via the communication link and interface established with the stub procedure at the event filtering core, as is indicated at step 426. At step 428, the filtering module forwards a report of the event to the appropriate event subscriber(s). As shown in decision block 430, the method can continue detecting and reporting events as desired. Also, the process can also continue monitoring any subscriber registration changes and/or additions, as is shown at process step 432.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. In a computer system including an event-detection component for detecting events and an event provider for reporting the occurrence of the events detected, a method for selecting which of the events detected are to be reported by the event provider, the method comprising the steps of:

storing, in a computer-readable medium accessible by the computer system, a database of possible events that can occur within the computer system or in an environment of the computer system, wherein the database of possible events that can occur within the computer system or in the environment of the computer is arranged and classified in a hierarchical fashion;

providing at least one event-filtering definition that specifies a subset of the possible events that are to be reported by the event provider;

detecting the occurrence of at least one of the possible events using the event-detection component; and forwarding reports from the event provider of the occurrence of only those detected events that are specified by the at least one event-filtering definition.

2. A method as defined in claim 1, wherein the hierarchical classification of the possible event classes defines at least a first event class and a second event class in a parent/child relationship.

3. A method as defined in claim 1, wherein the at least one event-filtering definition is written in a structured query language (SQL) format.

4. A method as defined in claim 1, wherein the event provider forwards reports of the occurrence of events via a defined interface.

5. A method as defined in claim 4, wherein the defined interface is provided by a proxy component that is associated with the event provider.

6. A method as defined in claim 1, further comprising the step of activating the event provider in response to a determination that the event provider is associated with a event-detection component that is configured to detect the occurrence of events specified by the at least one event-filtering definition.

7. A method as defined in claim 6, wherein at the time of activation of the event provider, a proxy component is associated with the provider and the at least one eventfiltering filtering definition is passed to the proxy component.

8. A method as defined in claim 7, further comprising the step of modifying the at least one event-filtering definition contained within the proxy.

9. A method as defined in claim 1, further comprising the steps of:

associating a proxy component with the event provider;

passing the at least one event-filtering definition to the proxy component;

filtering, by the proxy component, all of the events detected by the event-detection component so as to identify which of the events are specified by the at least one event-filtering definition; and forwarding the specified events from the event provider via the proxy component.

10. A method as defined in claim 1, wherein the reports of the event occurrences forwarded by the event provider are received by an event subscriber functioning within the computer system.

11. In a computer system including at least one event-detection component, a method for reporting the occurrence of selected detected events to an event subscriber, the method comprising the steps of:

receiving, at an event provider component, notifications of the occurrence of a plurality of events detected by at least one event-detection component;

at the event provider component, filtering, by using a proxy component that is associated with the event provider component, the notifications received to identify the existence of any subscriber-requested event from the plurality of events, wherein the event subscriber has requested a report of the occurrence of the subscriber requested event; and transmitting from the event provider component a report for every occurrence of any subscriber-requested event for reporting to the requesting event subscriber.

12. A method as defined in claim 11, further comprising the step of defining the subscriber-requested events using an event-filtering definition written in a structured query language (SQL).

13. A method as defined in claim 11, further comprising the step of discarding, at the event provider, all events from the plurality of events that are not subscriber-requested events.

14. A method for reporting the occurrence of selected events within a computer system environment to an event subscriber, the method comprising the steps of:

providing at least one event-filtering definition that specifies the selected events that are to be reported to the event subscriber;

activating an event provider that communicates with an event-detection component that is configured to detect the occurrence of at least one of the events specified by the at least one event-filtering definition;

associating a proxy component with the event provider;

receiving at an event provider notifications of the occurrence of all events detected by the event-detection component;

filtering by the proxy each of the notifications received by the event provider with the at least one event-filtering definition to identify which of the events are to reported to the event subscriber;

discarding at the proxy each of the notifications for which the events are not specified by the at least on event-filtering definition; and forwarding from the event provider by the proxy a report of each of the notifications received for which the events are specified by the at least on event-filtering definition.

15. A method as defined in claim 14, wherein event-filtering definition is written in a structured query language (SQL).

16. A method as defined in claim 15, wherein each of the notifications received by the event provider are passed to the proxy component that is associated with the provider via a defined interface.

17. A method as defined in claim 16, wherein the reports forwarded by the event provider proxy component are then forwarded to an object manager via a defined communications interface that exists between the proxy component and a stub component associated with the object manager.

18. A method as defined in claim 17, wherein the defined communications interface between the proxy component and the stub component is implemented across a network communications channel.

19. A method as defined in claim 18, wherein reports received by the object manager via a stub procedure are forwarded to the event subscriber via a second defined interface.

20. A system for reporting the occurrence of events to an event subscriber, the system comprising:

a digital computer for implementing a computer-executable method;

an event-detection component capable of detecting events in the system or in the environment of the system;

an event provider, in communication with the event-detection component, that is capable of reporting the occurrence of all events detected by the event-detection component;

an event subscriber capable of receiving reports of the occurrence of at least some of the events;

and wherein the computer-executable method comprises the steps of:

associating and invoking a proxy component at the event provider in a manner such that the proxy component is executing in a same execution space as the provider, and wherein the proxy has a defined interface for receiving all of the event occurrences reported by the event provider;

filtering, by the proxy component, each of the event occurrences reported by the event reported to identify which of the events are to be reported to the event subscriber;

forwarding notifications of the occurrence of only the events which are to be reported to the event subscriber from the event provider via its proxy component; and transmitting the reports to the event subscriber.

21. A system as defined in claim 20, further comprising a computer-readable medium having stored thereon a data structure defining a hierarchical classification of event classes that comprehend a set of possible events, wherein each of the possible events belongs to at least one of the event classes.

* * * * *

UNITED STATES PATENT AND TRADEMARK OFFICE
CERTIFICATE OF CORRECTION

PATENT NO. : 6,314,533 B1
DATED : November 6, 2001
INVENTOR(S) : Lev Novik, Raymond McCollum and Irena Hudis It is certified that error appears in the above-identified patent and that said Letters Patent is hereby corrected as shown below:

<u>Title page,</u>
ABSTRACT,
Line 3, after "Events" change "arc" to -- are --

<u>Column 1,</u>
Line 40, after "Events" change "arc" to -- are --

<u>Column 2,</u>
Lines 2 and 14, after "event" change "providers drivers" to -- providers, drivers, --
Line 56, after "subscribers." change "Prefcrably" to -- Preferably --

<u>Column 3,</u>
Line 11, after "computer" change "System" to -- system --
Line 33, after "due" and before "the" insert -- to --

<u>Column 4,</u>
Line 2, after "forwarded" and before "a" insert -- to --
Line 64, after "that" change "arc" to -- are --

<u>Column 6,</u>
Line 30, after "which can" and before "accessed" insert -- be --

<u>Column 7,</u>
Line 47, after "interfaces," change "Such" to -- such --

<u>Column 9,</u>
Line 12, after "environment," change "lor" to -- for --

UNITED STATES PATENT AND TRADEMARK OFFICE
CERTIFICATE OF CORRECTION

PATENT NO. : 6,314,533 B1
DATED : November 6, 2001
INVENTOR(S) : Lev Novik, Raymond McCollum and Irena Hudis It is certified that error appears in the above-identified patent and that said Letters Patent is hereby corrected as shown below:

Column 10,
Line 51, after "581-n" change "Buildin1-n" to -- Building1-n --

Column 11,
Line 21, after "Language" change "(SQI)" to -- (SQL) --
Line 38, after "designate" change "with" to -- which --
Line 46, after "select*from" change "SecurityBreachFvent" to -- SecurityBreach Event --
Line 54, after "shown" and before "in FIG." delete [24]
Line 56, after "going" change "eventI)ocCket" to -- event --

Column 12,
Line 29, after "58b" change "(Buildino2" to -- (Building2 --

Column 14,
Line 24, change "Brcach" to -- Breach --

Column 16,
Line 54, after "have one" and before "more" insert -- or --

Column 18,
Line 12, after "However, if" and before "was" insert -- it --

Column 20,
Line 2, after "by way of" and before "defined" change "an" to -- a --

Column 21,
Line 67, after "eventfiltering" and before "definition" delete [filtering]

UNITED STATES PATENT AND TRADEMARK OFFICE
CERTIFICATE OF CORRECTION

PATENT NO. : 6,314,533 B1
DATED : November 6, 2001
INVENTOR(S) : Lev Novik, Raymond McCollum and Irena Hudis It is certified that error appears in the above-identified patent and that said Letters Patent is hereby corrected as shown below:

Column 22,
Line 59, after "are to" and before "reported" insert -- be --
Lines 62 and 66, after "least" change "on" to -- one --

Signed and Sealed this

Twenty-fifth Day of June, 2002

Attest:

JAMES E. ROGAN
Attesting Officer   Director of the United States Patent and Trademark Office